US006922629B2

(12) United States Patent
Yoshikawa et al.

(10) Patent No.: US 6,922,629 B2
(45) Date of Patent: Jul. 26, 2005

(54) TRAFFIC INFORMATION RETRIEVAL METHOD, TRAFFIC INFORMATION RETRIEVAL SYSTEM, MOBILE COMMUNICATION DEVICE, AND NETWORK NAVIGATION CENTER

(75) Inventors: Kazutaka Yoshikawa, Okazaki (JP); Masaki Nakamura, Okazaki (JP); Katsuhiko Mutsuga, Okazaki (JP); Hiroki Ishikawa, Chiyoda-ku (JP)

(73) Assignee: Aisin AW Co., Ltd., Anjo (JP)

(*) Notice: Subject to any disclaimer, the term of this patent is extended or adjusted under 35 U.S.C. 154(b) by 94 days.

(21) Appl. No.: 10/398,800

(22) PCT Filed: Aug. 9, 2002

(86) PCT No.: PCT/JP02/08191

§ 371 (c)(1),
(2), (4) Date: May 5, 2003

(87) PCT Pub. No.: WO03/014671

PCT Pub. Date: Feb. 20, 2003

(65) Prior Publication Data

US 2004/0034464 A1 Feb. 19, 2004

(30) Foreign Application Priority Data

Aug. 10, 2001 (JP) ........................................ 2001-245049

(51) Int. Cl.[7] .............................................. G01C 21/34
(52) U.S. Cl. ................... 701/117; 701/210; 340/995.13
(58) Field of Search ................................ 701/117, 200, 701/201, 204, 209–211; 340/995.13, 995.18, 995.19, 995.21, 995.22, 995.23

(56) References Cited

U.S. PATENT DOCUMENTS 5,610,821 A  *  3/1997  Gazis et al. ............. 455/456.5
6,232,917 B1 *  5/2001  Baumer et al. ......... 342/357.13
6,236,933 B1 *  5/2001  Lang ........................... 701/117
6,256,577 B1 *  7/2001  Graunke ..................... 701/117
6,317,686 B1 * 11/2001  Ran ............................ 701/210
6,401,027 B1 *  6/2002  Xu et al. .................... 701/117
6,466,862 B1 * 10/2002  DeKock et al. ............. 701/117
6,480,783 B1 * 11/2002  Myr ............................ 701/117
6,490,519 B1 * 12/2002  Lapidot et al. ............. 701/117
6,615,130 B2 *  9/2003  Myr ............................ 701/117
2001/0029425 A1 * 10/2001  Myr ............................ 701/200
2002/0077741 A1 *  6/2002  Hanebrink .................. 701/117
2004/0054468 A1 *  3/2004  Yamada et al. ............. 701/211

FOREIGN PATENT DOCUMENTS

| JP | U 4-20200 | 2/1992 |
| JP | A-9-287966 | 11/1997 |
| JP | 2000-258174 A | 9/2000 |
| JP | 2001-23084 A | 1/2001 |
| JP | A-2001-118188 | 4/2001 |
| JP | 2001-118188 A | 4/2001 |

* cited by examiner

Primary Examiner—Gary Chin
(74) Attorney, Agent, or Firm—Oliff & Berridge, PLC

(57) ABSTRACT

From a mobile communication device, road information about either a preliminarily registered point or an arbitrary point on a route from a present position to a destination is transmitted to and received in a network navigation center via a cellular phone base station and a general telephone network. Based on that road information, the network navigation center retrieves traffic information about the registered point or the arbitrary point on the route, and then transmits the retrieved traffic information to the mobile communication device via the general telephone network and the cellular phone base station. The traffic information includes traffic congestion area data about the registered point or the arbitrary point on the route, which is displayed on a display in the mobile communication device wherein the user is informed of future traffic information like traffic congestion.

14 Claims, 17 Drawing Sheets

TRAFFIC INFORMATION RETRIEVAL METHOD, TRAFFIC INFORMATION RETRIEVAL SYSTEM, MOBILE COMMUNICATION DEVICE, AND NETWORK NAVIGATION CENTER

BACKGROUND OF THE INVENTION

1. Field of Invention

The invention relates to a traffic information retrieval method and a traffic information retrieval system.

2. Description of Related Art

Conventionally, many vehicle navigation apparatuses have been used in order to support smooth-driving of a vehicle. This smooth-driving is achieved by superimposing a present position of the traveling vehicle and a route from a present position to a destination using road maps displayed on a display. A communication function carried out in such a conventional vehicle navigation apparatus permits real-time display of traffic information, for example traffic congestion and traffic accidents, as well as permits display of a present position of the vehicle and a route. At present, such function and a system thereof are actualized in a VICS (Vehicle Information and Communication System).

In the VICS, the traffic information, like traffic congestion and traffic accidents, are received in the vehicle navigation apparatus. When the traffic information is received, the navigation apparatus starts to change the colors used to represent roads or intersections, from which the traffic information is given, on a road map. Further, navigational arrows are additionally displayed near the color-changed roads or intersections. The user can check the spot where the traffic congestion is increased or the scene of the traffic accident. Such check helps the user to select the optimal road to circumvent the traffic congestion spot or the scene of the traffic accident.

The user does not always need the traffic information about the present position of the vehicle. The user sometimes needs traffic information, for example, which identifies the traffic congestion or the traffic accident which happens beyond a range of the currently displayed road map. In such a case, the user manually operates a key-switch in the vehicle navigation apparatus in order to display the road on which the user wants to know the traffic information. By this manual operation, the map of the road on which the user wants to know the traffic information is displayed. This is how the user can check the traffic information about the road displayed on the map.

Further, the traffic information changes moment by moment. In detail, there is a possibility that traffic congestion is relieved while the vehicle is traveling from a present position to the traffic congestion spot or a possibility that a new traffic accident occurs while the vehicle is traveling from a present position to the destination. The user thus does not always need real-time traffic information but rather wants to obtain future traffic information. In VICS, only the real-time information is obtained. Therefore the user may regard sometimes the VICS information only for reference purposes.

SUMMARY OF THE INVENTION

Accordingly, the invention thus provides a traffic information retrieval method, a traffic information retrieval system, a mobile communication device, and a network navigation center, which allow the user to easily obtain future traffic information about a distant position from the present position of the vehicle.

A method of retrieving tracking information according to one exemplary aspect of the invention includes the steps of storing predictive traffic information derived from statistical processing in relation to at least positional information and date-and-time information, inputting a registered point, obtaining positional information about the registered point, computing predictive arrival date-and-time information about the registered point, retrieving predictive traffic information related to both the positional information and the predictive arrival date-and-time information about the registered point, and outputting the retrieved predictive traffic information.

A method of retrieving traffic communication according to another exemplary aspect of the invention includes storing predictive traffic information derived from statistical processing in relation to at least positional information and date-and-time information, inputting a present position of a mobile communication device and a destination, searching a route from the present position to the destination, obtaining positional information about at least one point among arbitrary points on the route, computing predictive arrival date-and-time information about the at least one point on the route, retrieving the predictive traffic information related to the positional information and the predictive arrival date-and-time information about the at least one point on the route, and outputting the predictive traffic information.

A traffic information retrieval system according to another exemplary aspect of the invention includes a storage device that stores predictive traffic information derived from statistical processing in relation to at least positional information and date-and-time information, an input device that inputs a registered point, and a controller that obtains the positional information about the registered point, computes predictive arrival date-and-time information about the registered point, retrieves the predictive traffic information related to the positional information and the predictive arrival date-and-time information about the registered point from the storage device, and outputs the retrieved predictive traffic information.

A traffic information retrieval system according to another exemplary aspect of the invention includes a storage device that stores predictive traffic information derived from statistical processing in relation to at least positional information and date-and-time information, a detector that detects a present position of a mobile communication device, an input device that inputs a destination, and a controller that searches a route from the present position to the destination, obtains positional information about at least one point among arbitrary points on the route, computes predictive arrival date-and-time information about the at least one point on the route, retrieves the predictive traffic information related to the positional information and the predictive arrival date-and-time information about the at least one point on the route from the storage device, and outputs the retrieved predictive traffic information.

A mobile communication device which transmits/receives various information to/from a network navigation center according to another exemplary aspect of the invention includes an input device that inputs a registered point, and a controller that, obtains the positional information about the registered point, computes predictive arrival date-and-time information about the registered point, transmits the positional information and the predictive arrival date-and-time information about the registered point to the network navigation center, receives predictive traffic information related to the positional information and the predictive arrival date-and-time information from the network navigation center, and outputs the received predictive traffic information.

A mobile communication device which transmits/receives various information to/from a network navigation center according to another exemplary aspect of the invention includes a detector that detects a present position of the mobile communication device, an input device that inputs a destination, and a controller that searches a route from the present position to the destination, obtains positional information about at least one point among arbitrary points on the route, computes predictive arrival date-and-time information about the at least one point on the route, transmits the positional information and the predictive arrival date-and-time information about the at least one point on the route to the network navigation center, receives predictive traffic information related to the positional information and the predictive arrival date-and-time information from the network navigation center, and outputs the received predictive traffic information.

A network navigation center according to another exemplary aspect of the invention includes a storage device that stores predictive traffic information derived from statistical processing in relation to at least positional information and date-and-time information, a receiver that receives a present position of a mobile communication device and positional information about a registered point from the mobile communication device, and a controller that computes predictive arrival date-and-time information that represents the date and time of arrival at the registered point from the present position retrieves the predictive traffic information related to the positional information and the predictive arrival date-and-time information about the registered point from the storage device, and transmits the predictive traffic information to the mobile communication device.

A network navigation center according to another exemplary aspect of the invention includes a storage device that stores predictive traffic information derived from statistical processing in relation to at least positional information and date-and-time information, a receiver that receives a present position of a mobile communication device and positional information about a destination from the mobile communication device, and a controller that searches a route from the present position to the destination, obtains positional information about at least one point among arbitrary points on the route, computes predictive arrival date-and-time information about the at least one point on the route, retrieves predictive traffic information related to the positional information and the predictive arrival date-and-time time information about the at least one point on the route from the storage device, and transmits the retrieved predictive traffic information to the mobile communication device.

BRIEF DESCRIPTION OF THE DRAWINGS

Various embodiments of the invention will be descried in detail with reference to the following figures, wherein.

DETAILED DESCRIPTION OF PREFERRED EMBODIMENTS

Figure 1:
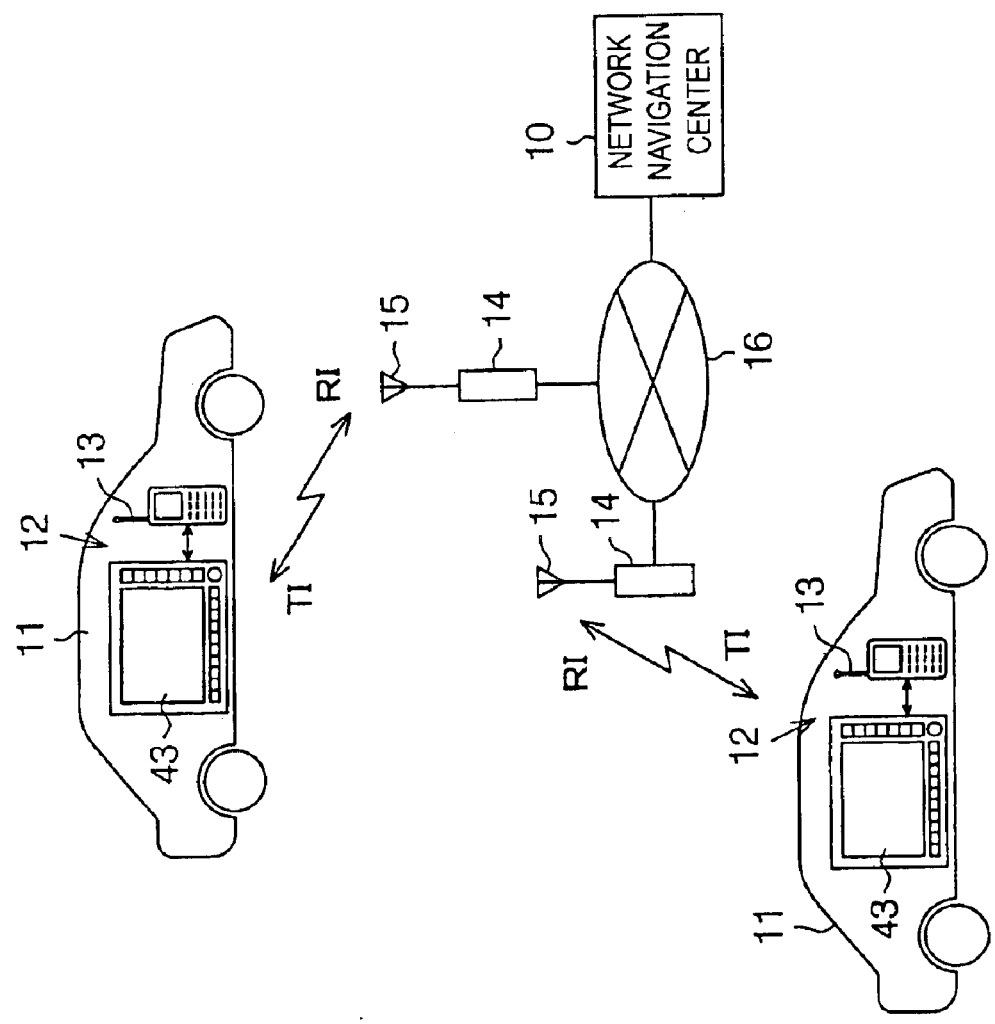
FIG. 1 is a block diagram showing a system configuration of a traffic information retrieval system according to an embodiment of the invention.

The followings are embodiments of the invention, which will be described with reference to the drawings. FIG. 1 is a block diagram showing a system configuration of a traffic information retrieval system according to the invention. In FIG. 1, a network navigation center 10 having a computer system intercommunicates various information with a mobile communication device 12 mounted on a user's vehicle 11. The various information includes, for example, road information RI and road traffic information TI.

In detail, the road information RI outputted from the device 12 is transmitted as radio wave signals via an antenna 13 which is attached to the device 12. The road information RI includes road data about roads located within a specified distance (e.g., three kilometers in this embodiment) from any point which is set by the device 12. The road information also includes predictive arrival date-and-time data about a predictive date-and-time when the user's vehicle arrives at the road located within the specified distance. The transmitted radio wave signals are received by a base station antenna 15 in a cellular phone base station 14, and are then transmitted to the center 10 via a general telephone network 16.

To the contrary, the traffic information TI from the center 10 is distributed as radio wave signals from the antenna 15 in the station 14 via the network 16. Based on the road information RI, the traffic information TI is retrieved in the center 10. The traffic information TI includes traffic congestion data for an area as the predictive traffic information that represents the congested area on the road and necessary time to get out of such traffic congestion area.

Further, the radio wave signals from the center 10 may be received by the antenna 13 and then transmitted to the device 12. That is, the center 10 and the device 12 mounted on the vehicle 11 are connected with each other on the wireless Internet. It is also possible to connect the device 12 mounted on the vehicle 11 directly to the center 10 via the wireless Internet without using the general telephone network 16. This direct connection is achieved with the installation of a TA (Terminal Adapter) and a DSU (Digital Service Unit) in the mobile communication device.

Figure 2:
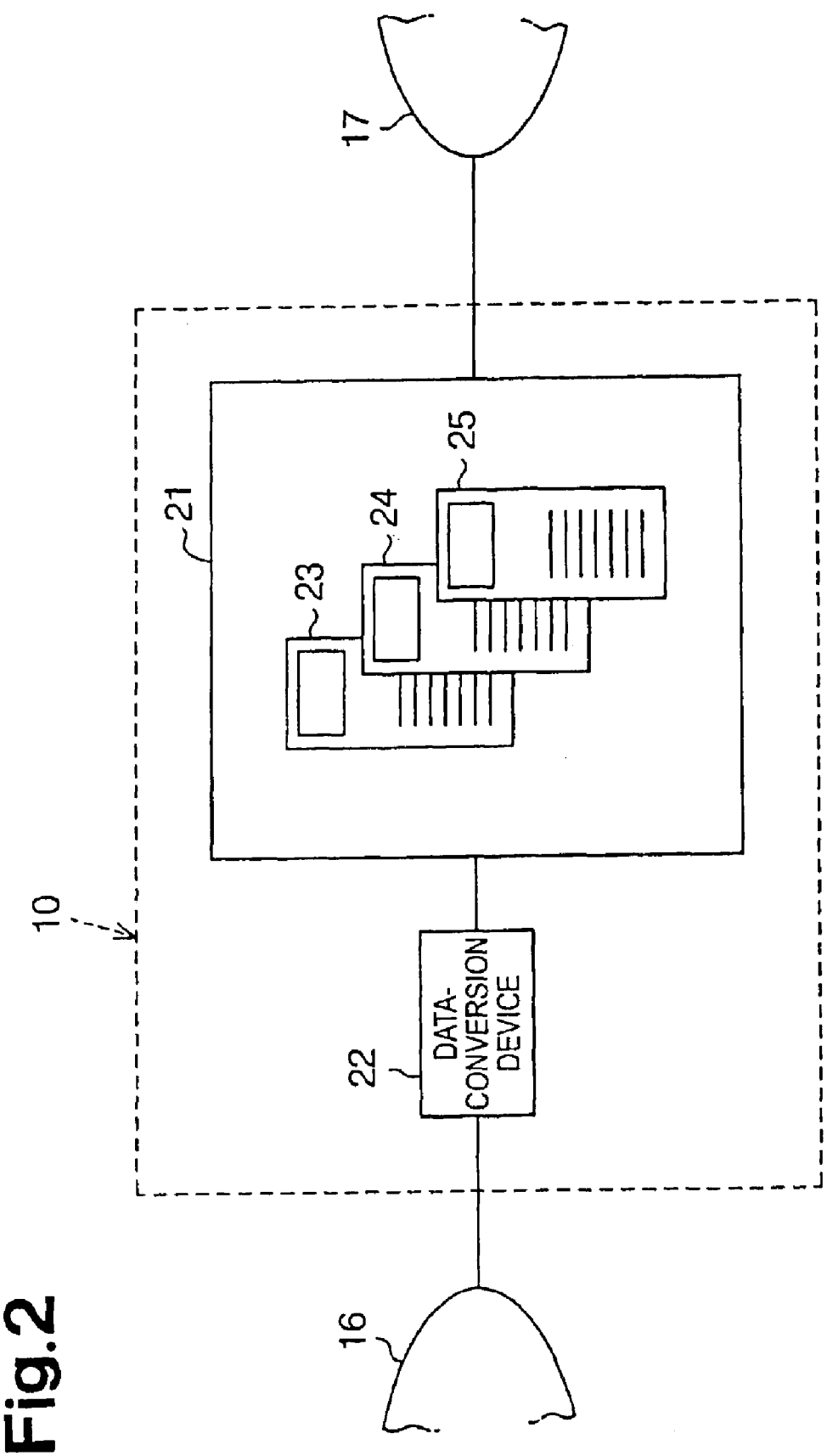
FIG. 2 is a block diagram showing a configuration of a network navigation center.

As shown in FIG. 2, the network navigation center 10 comprises a server group 21 and a data-conversion device 22. The server group 21 is comprised of a user server 23, a traffic information server 24 working as a storage device, and a control server 25 working as a predictive traffic information retrieval device, receiving device, and transmitting device.

The user server 23 stores user data about users who receive the traffic information TI via the device 12. The user data is comprised of name data, address data, cellular phone number data, and IP (Internet Protocol) address data. The traffic information server 24 stores predictive traffic congestion data about respective roads. The predictive traffic congestion data is comprised of road data, date-and-time data working as date-and-time information, and the traffic congestion area data. The predictive traffic congestion data is derived from statistical processing of past traffic information and stored into the server 24 in the predictive traffic information storage step.

Among the predictive traffic congestion data, the road data is related to specified road sections that are separated by traffic lights and intersections. Specifically, the road data includes both a departure point and an endpoint, which are found in map data in the device 12, respectively represented by latitude X and longitude Y. The date-and-time data represents both a predictive date and a predictive time period when traffic congestion normally takes place; for example, the date-and-time data represents a predictive date and a predictive time period of "August, 1, 21:00–21:30," for example. The traffic congestion area data includes area data that represents an area of the traffic congestion, defined by the departure point and the endpoint respectively represented by the latitude X and the longitude Y, that occurs within the specified road sections on the predictive date and at the predictive time period. Further, the traffic congestion area data includes delay-time data that represents delay time i.e., the necessary time to get out of the traffic congestion.

The control server 25 centrally controls the server 23 and the server 24. The control server 25 is connected to the device 12 through the data-conversion device 22, the general telephone network 16, and the cellular phone base station 14. The control server 25 includes a storage unit for storing a traffic information retrieval program. Based on this traffic information retrieval program, accordingly the following computer-processing is carried out. Based on the road information RI transmitted from the device 12, the traffic information retrieval program enables the control server 25 to carry out a series of processing such as extraction of the traffic congestion area data from the server 24 and storage of that extracted data into the storage unit in the server 25. Further, the storage unit in the server 25 stores a traffic information distribution program to carry out the following computer-processing. The traffic information distribution program enables a distribution of the traffic information TI, that includes the traffic congestion area data extracted by the traffic information retrieval program, to the device 12.

In the present embodiment, various data stored/controlled in the servers 23, 24, and 25 is registered by an administrator who works at the center 10. The administrator collects various data from various information media including the Internet 17, telephones, facsimiles, televisions, radios, and magazines. The various data collected is registered from a personal computer into the servers 23, 24, and 25 in the center 10. The data-conversion device 22 is a signal conditioning circuit by which the incoming information from the general telephone network 16 is converted into an information-form that is receivable in the control server 25. In addition, the device 22, as the signal conditioning circuit, converts the traffic information TI read out from the control server 25 into information-form that can be outputted to the cellular phone base station 14 via the general telephone network 16.

Figure 3:
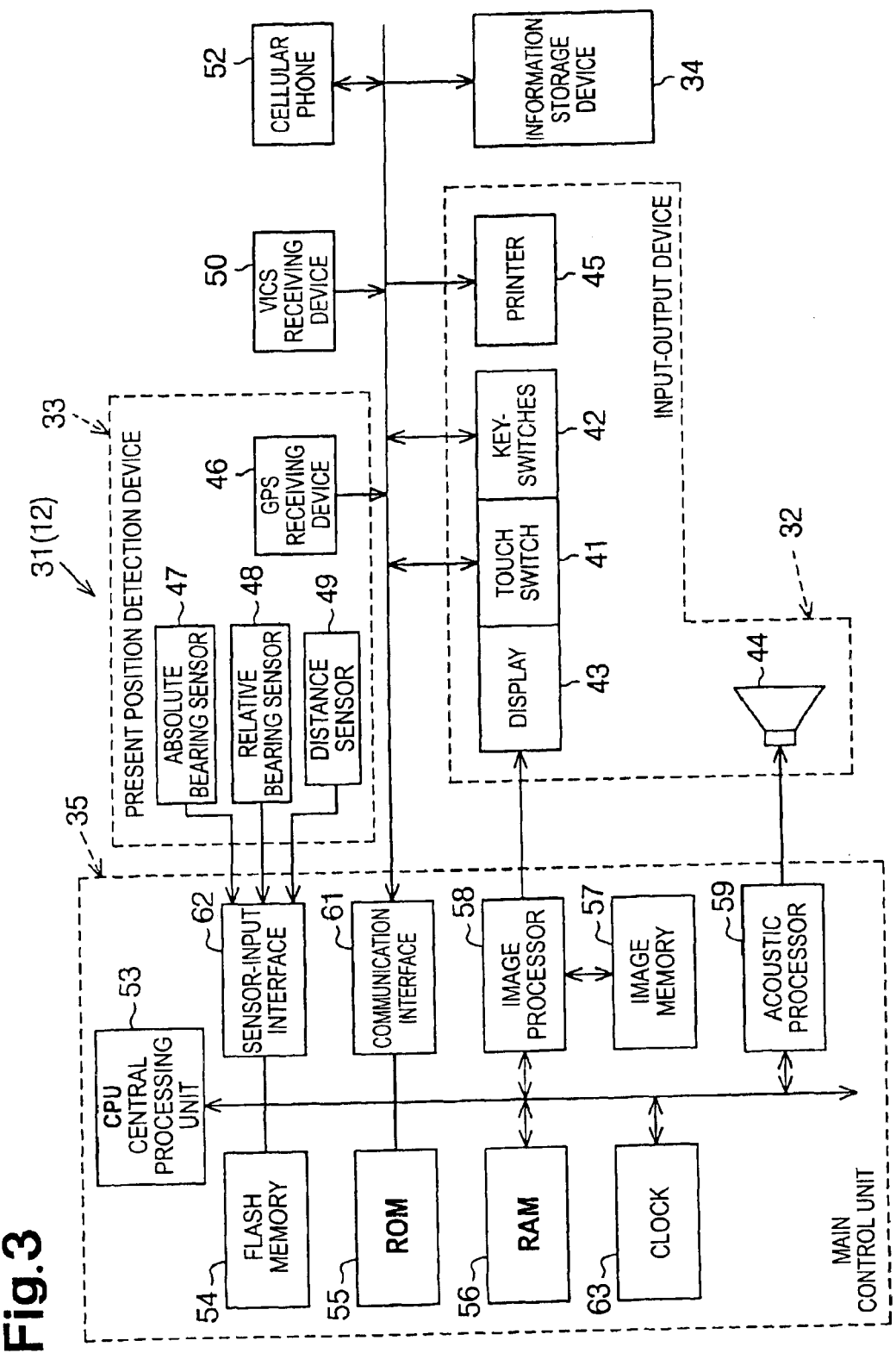
FIG. 3 is a block connection diagram showing a configuration of a vehicle navigation apparatus.

Hereinafter, the mobile communication device 12 mounted on the vehicle 11 to which the traffic information TI is distributed from the network navigation center 10 will be described. Here, the device 12 is included in a vehicle navigation apparatus 31. As shown in FIG. 3, the apparatus 31 includes an input-output device 32 serving as both an input device and an output device, a present position detection device 33, a VICS (Vehicle Information and Communication System) receiving device 50 as a communication device, a cellular phone 52 as a communication device, an information storage device 34, and a main control unit 35. Here, the VICS works as a system that transmits traffic congestion information and road regulatory information to vehicles.

The input-output device 32 is designed to input destination as well as to output guidance information acoustically or visually on the screen when the user's needs arises. Specifically, the device 32 commands the main control unit 35 to carry out navigational-processing at the user's disposal. Further, the device 32 commands the main control unit 35 to output the traffic information TI, which is distributed form the center 10, onto the display if the user's need arises.

The input-output device 32 comprises a touch switch 41, key-switches (a jog-function key and a power switch) 42, a display 43, a speaker 44, and a printer 45. The touch switch 41 is used to request a destination, a telephone number, a present position on the map, and route guidance that is provided on a screen 43a of the display 43. Likewise, the key-switches 42 are used to request a destination, a telephone number, a present position on the map, and route guidance that is provided around the display 43.

Figure 22:
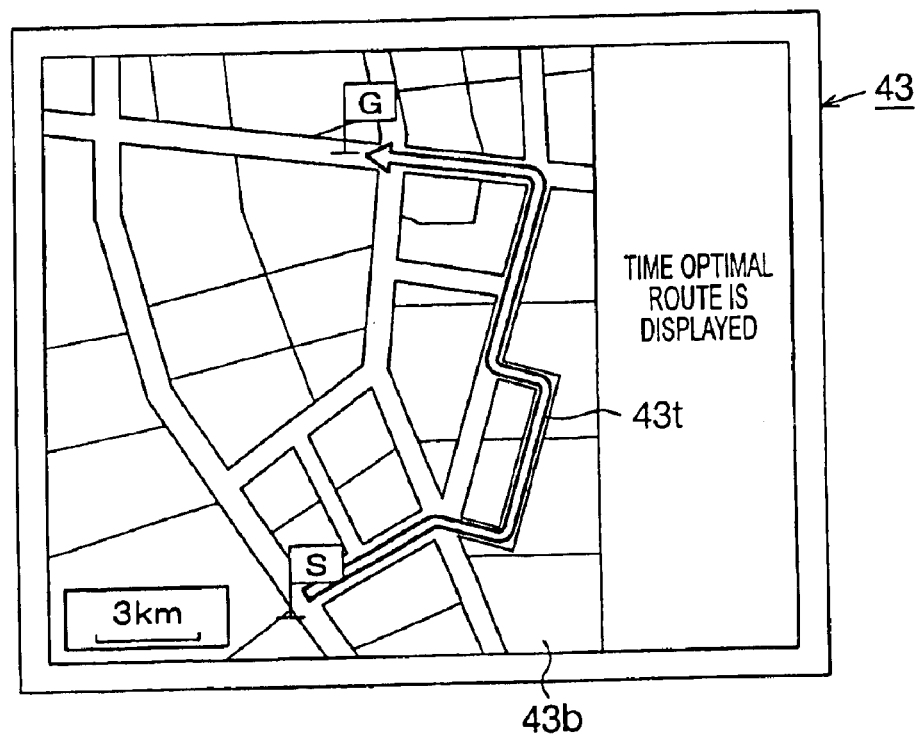
FIG. 22 illustrates a traffic congestion circumventive route displayed on a screen.
Figure 23:
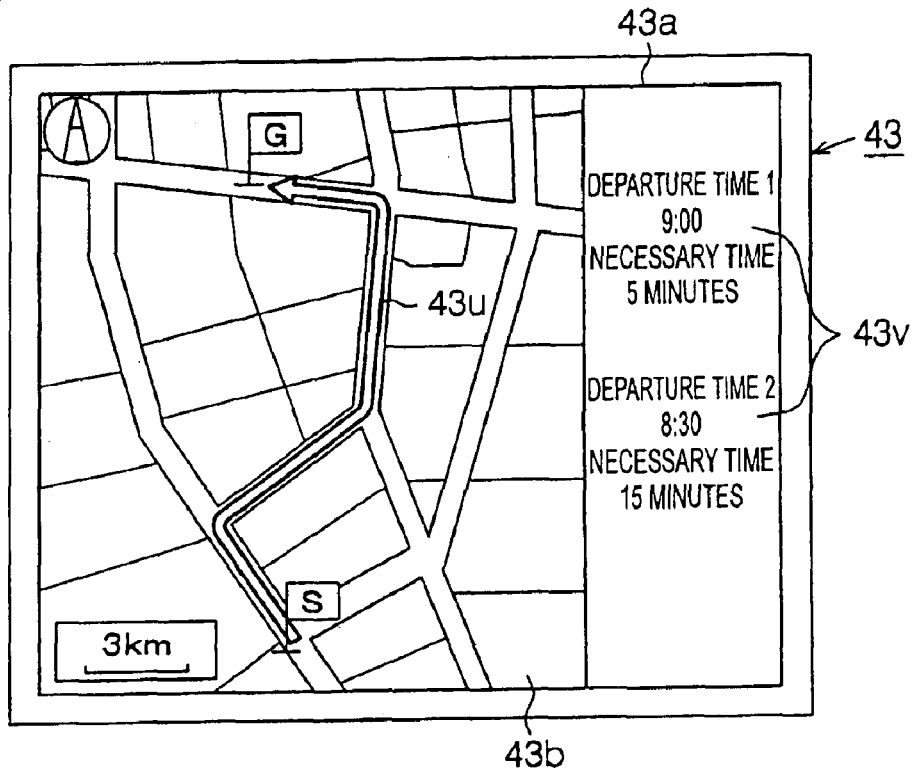
FIG. 23 illustrates time-optimal departure time displayed on a screen.
Figure 24:
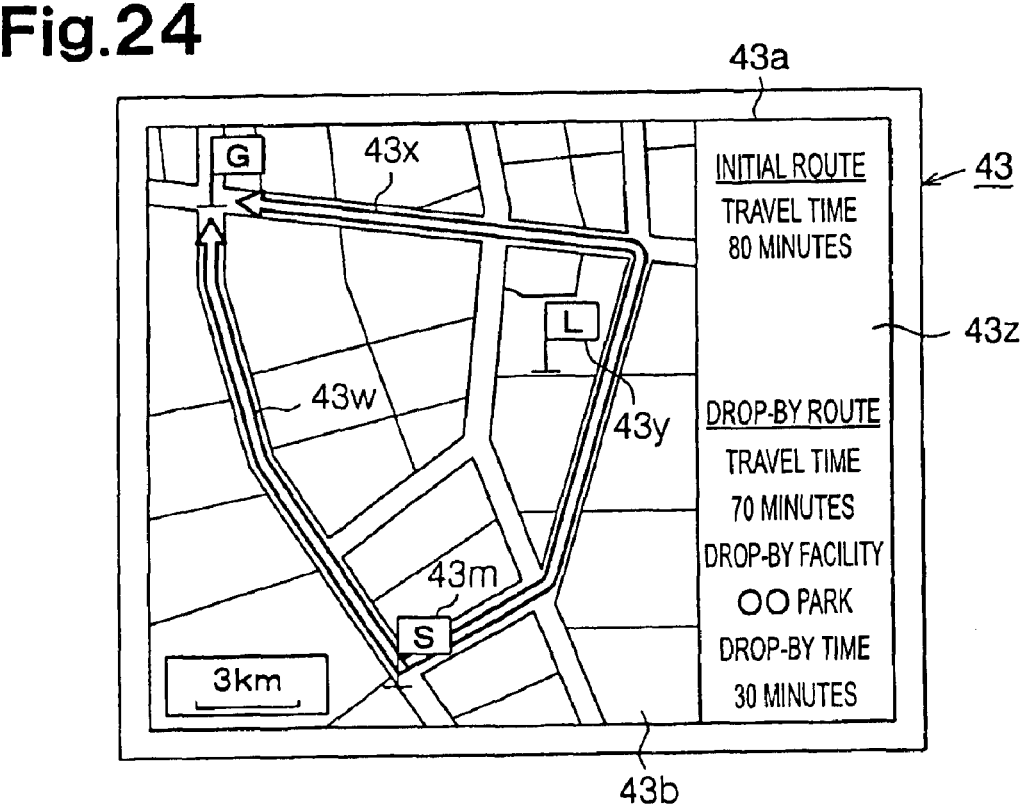
FIG. 24 illustrates a drop-by route displayed on a screen.

As shown and explained in FIG. 9 through FIG. 16 as well as FIG. 22 through FIG. 24, the display 43, as a color liquid crystal display, shows a map 43b, pointers 43c, 43k, buttons 43d, 43e, 43l, 43p, 43q, a list 43f, cursors 43g, 43j, message boxes 43h, 43r, 43v, 43z navigational indicators 43i, 43o, 43s–43u, a start flag 43m, and a goal flag 43n that are displayed based on the map data and image data. The speaker 44 acoustically outputs the route guidance. The printer 45 prints out the data, which is processed in the main control unit 35, on recording paper.

The present position detection device 33 detects or receives information about the present position of the vehicle. The device 33 comprises a GPS receiving device 46, an absolute bearing sensor 47, a relative bearing sensor 48, and a distance sensor 49. The GPS receiving device 46 detects the present position of, heading of, and speed of the vehicle by using the GPS (Global Positioning System). The sensor 47 includes an earth magnetism sensor. The sensor 48 comprises a steering sensor and a gyro. The sensor 49 calculates a travel distance of the vehicle according to the rotational frequency of wheels.

The VICS receiving device 50 receives the road information transmitted from FM multiplex broadcasting stations or beacons (as transmitters located along roads, for transmitting to vehicles the traffic congestion information and the road regulatory information about narrow areas). The cellular phone 52 as a transmitting device and a receiving device receives the traffic information TI, that is transmitted from the antenna 15 in the base station 14, via the general telephone network 16, from the center 10. Further, the cellular phone 52 transmits the road information RI to the base station 14, and thereby the road information RI is transmitted to the center 10 via the network 16.

The information storage device 34 stores a navigation program and navigation data. The navigation program includes a map-drawing routine, a route-search routine, a route-guidance routine, a present position calculation routine, and a destination positioning operation control routine. The device 34 also includes an application program and an OS (Operating System) for signal-conditioning for the navigation guidance. By the program and data stored in the device 34, the followings are possible: a route and an arbitrary point on the route are searched, as well as, a display of the route guidance and an acoustic output of the guidance may be controlled. Furthermore, the device 34 stores information that is used for the route guidance and the map display.

Further, by the program and data stored in the device 34, a destination and a passing point, which are both set based on the present position detected by the device 33 and also set based on input signals from the key switches 42, may be set as well as the route search that may be carried out through the use of search road data. Additionally, the search road data is converted in order to re-search the route based on the traffic information obtained from the VICS receiving device 50. And further, the map-drawing, map-matching, determination of the time at which the acoustic guidance is outputted, and determination of an acoustic phrase to be outputted along the route are carried out based on the program and data stored in the device 34.

The navigation data includes the map data (a road map, a residential map, and a building-shape map), parking area data, intersection data, node data, road data, photographic data, registered point data, destination point data, destination reading data, telephone number data, address data, and all other data necessary for the navigation apparatus. Further, the navigation data includes a drop by facility data about a name of a drop-by facility (for example, a park), positional coordinates of the drop-by facility, and drop-by time just for circumventing the traffic congestion.

Moreover, the device 34 contains a point registration program. This program is used to store the registered point data, that are related to both coordinates data and the name data about a point for which the traffic information TI is needed, into the storage device 34. In detail, this point registration program comprises the following routines. First, the program detects the coordinates of a point that is selected by the key-switches 42 and retrieves the name of that point from the device 34 based on the detected coordinates. The program then stores the coordinates and the name of the point into the device 34 as registered point data. Additionally, the device 34 stores a traffic information acquisition program. This program includes the following routines. First, the program extracts the road information RI and transmits the road information RI to the center 10. The program then outputs the traffic information TI, that is distributed from the center 10, into a map form. Further in detail, the traffic information acquisition program includes the following routines. The program extracts the road information RI about the road located within a three-kilometer range (in the present embodiment) from any point on any of the guidance routes searched by the navigation program or from the any registered points registered by the point registration program. Then, the program transmits the road information RI from the cellular phone 52 to the center 10. Subsequently, the program receives the traffic information TI distributed from the center 10 by the cellular phone 52, forwards the received traffic information TI to the main control unit 35, and outputs the traffic information TI onto the display 43.

Moreover, the device 34 stores a traffic congestion circumventive route search program. In this program, an original route is first determined. Then the road information RI about that original route is extracted and transmitted to the center 10. If there is a traffic congestion area on the original route, another route to circumvent such traffic congestion area is re-searched and outputted based on the traffic information TI distributed from the center 10. In detail, the traffic congestion circumventive route search program includes the following routine. First, the program extracts the road information RI about the roads which make up the original route searched by the navigation program. The program then transmits that road information RI from the cellular phone 52 to the center 10. Then, this program receives the traffic information TI distributed from the center 10 by the cellular phone 52 in order to check, based on that received traffic information TI, whether there is some traffic congestion area on the original route. If there is traffic congestion area on the original route, the route to circumvent such traffic congestion is re-searched by the navigation program. Then, the program extracts the road information RI about the roads which makes up the re-searched route. Further then, like the original route, the program transmits the road information RI about the re-searched route to the center 10 and obtains the traffic information TI. In the traffic congestion circumventive route search program, the routine for re-searching the route is repeated over specified times (in the present embodiment, repeated twice). This repetition can improve the precision of the search of the traffic congestion circumventive route. Then, over all re-searched routes, the necessary time to travel may be respectively calculated; and each calculated necessary time is compared with each other. Thereby, the time-optimal route to circumvent the traffic congestion is selected from the re-searched routes and outputted onto the display 43.

And moreover, the device 34 stores a departure time determination program. This program includes the following routines. First, the program determines a route. Next, the program sets some departure time for that route and extracts the road information RI about that route according to each departure time. Subsequently, the program transmits the extracted road information RI to the center 10. Then, the program determines an optimum departure time to reach the destination in the shortest period of time. This determination is based on traffic information TI, which is distributed from the center 10, in accordance with each departure time.

In detail, the departure time determination program comprises the following routines. The program extracts road information RI about the roads which make up the route searched by the navigation program in accordance with each departure time (in the present embodiment, the departure time is varyingly set at 15-minute intervals for three hours from the present departure time.) Subsequently, the program transmits each extracted road information RI from the cellular phone 52 to the center 10. Then, the program receives each traffic information TI distributed from the center 10 by the cellular phone 52 and calculates the necessary time to travel the route in accordance with each departure time. Thereupon, the program compares each calculated necessary time with one another. Further then, the program extracts the first optimum departure time and the second optimum departure time from some calculated necessary time, and outputs them onto the display 43.

Furthermore, the device 34 stores a drop-by route search program. This program comprises the following routines. The program first determines the original route. Next, the program extracts the road information RI about that original route and transmits the road information RI to the center 10. Then, if there is a traffic congestion area on the original route, the program re-searches the drop by route by which the traffic congestion area may be circumvented. This re-search is based on the traffic information TI distributed from the center 10. In detail, the drop-by route search program includes the following further routines. First, the program extracts the road information RI about one of the roads which make up the original route searched by the navigation program. Subsequently, the program transmits the extracted road information RI from the cellular phone 52 to the center 10. Then, the program receives the traffic information TI distributed from the center 10 by the cellular phone 52 and checks whether there is the traffic congestion area on the original route. This check is based on the received traffic information TI. If there is the traffic congestion area on the original route, the information retrieves from the device 34 the drop-by facility data about the drop-by facility located within a specified distance from the congested road on the original route. Subsequently, according to the retrieved drop-by facility data, the program re-searches a route on which the drop-by facility exists by the navigation program. Then, the program extracts the road information RI about the roads which make up the re-searched route and obtains from the center 10 the traffic information TI about the re-searched route.

In the drop-by route search program, the routine that re-searches the route is repeated over specified times (in the present embodiment, repeated twice). This repetition can improve the precision of the search of the drop-by route to circumvent the traffic congestion. Then, over all re-searched routes, the necessary time to travel may be respectively calculated. Thereby, the time-optimal drop-by route to circumvent the traffic congestion is selected from the re-searched routes and outputted onto the display 43.

The main control unit 35 comprises a central processing unit (CPU) 53 serving as a positional information acquisition device, a predictive arrival date-and-time information computing device, and a route search device. The main control unit 35 further comprises a flash memory 54, a ROM 55, a RAM 56, an image memory 57, an image processor 58, an acoustic processor 59, a communication interface 61, a sensor-input interface 62, and a clock 63.

The CPU 53 carries out many types of processing. Specifically, the flash memory 54 stores the navigation program, the point registration program, and the traffic information acquisition program, the traffic congestion circumventive route search program, the departure time determination program, an the drop-by route search program, which are all readout from the information storage device 34. The ROM 55 stores a program by which the programs stored in the flash memory 54 are program-checked and updated.

The RAM 56 as a storage device temporarily stores coordinates of the destination point set by the user, guidance information about the route searched by the system, and under-processing data. Further, the RAM 56 temporarily stores the traffic information TI that is distributed from the center 10 and received by the cellular phone 52. The image memory 57 stores image data about the map 43b displayed onto the screen 43a of the display 43. The image processor 58 reads out the image data from the image memory 57 according to display control signals from the CPU 53, and then carries out image-processing over the readout image data, wherein the map 43b is displayed onto the display 43.

The acoustic processor 59 synthesizes voices, phrases, composed sentences, and sounds which are readout from the device 34 based on the acoustic output control signals from the CPU 53 and used in the travel guidance. The synthesized resultants are converted to analog signals to be outputted from the speaker 44. The communication interface 61 inter-communicates data between the main control unit 35 and the GPS receiving device 46 included in the present position detection device 33, the VICS receiving device 50, or the cellular phone 52. The sensor-input interface 62 receives sensor signals from the absolute bearing sensor 47, the relative bearing sensor 48, and the distance sensor 49 which are all included in the device 33. The clock 63 writes a date-and-time into internal diagnostic information.

Based on the navigation program which is readout from the device 34 and stored in the flash memory 54, the CPU 53 lets the vehicle navigation apparatus 31 carry out basic operations. In detail, based on the various data obtained by the device 33, the CPU 53 calculates a present position of the vehicle at intervals of specified time. The calculated present position as present position information is temporarily written into the RAM 56. Here, the calculated present position has an experienced map-matching process in view of detection errors of the various data. As for the guidance route, the CPU 53 is allowed to present the guidance route to the user in either screen-display form or acoustic output. The presentation of the guidance route depends on a user's selection with the touch switch 41 or the key-switches 42.

With reference to the flowcharts shown in FIG. 4 through FIG. 8, processing is interactively carried out between the network navigation center 10 and the vehicle navigation apparatus 31. Since fundamental functions of the apparatus 31 such as a present position detection, a map display, and a route search are the same as those of conventional navigation apparatuses, here only specific operations carried out between the apparatus 31 and the center 10 will be described for the sake of explanatory convenience.

Figure 4:
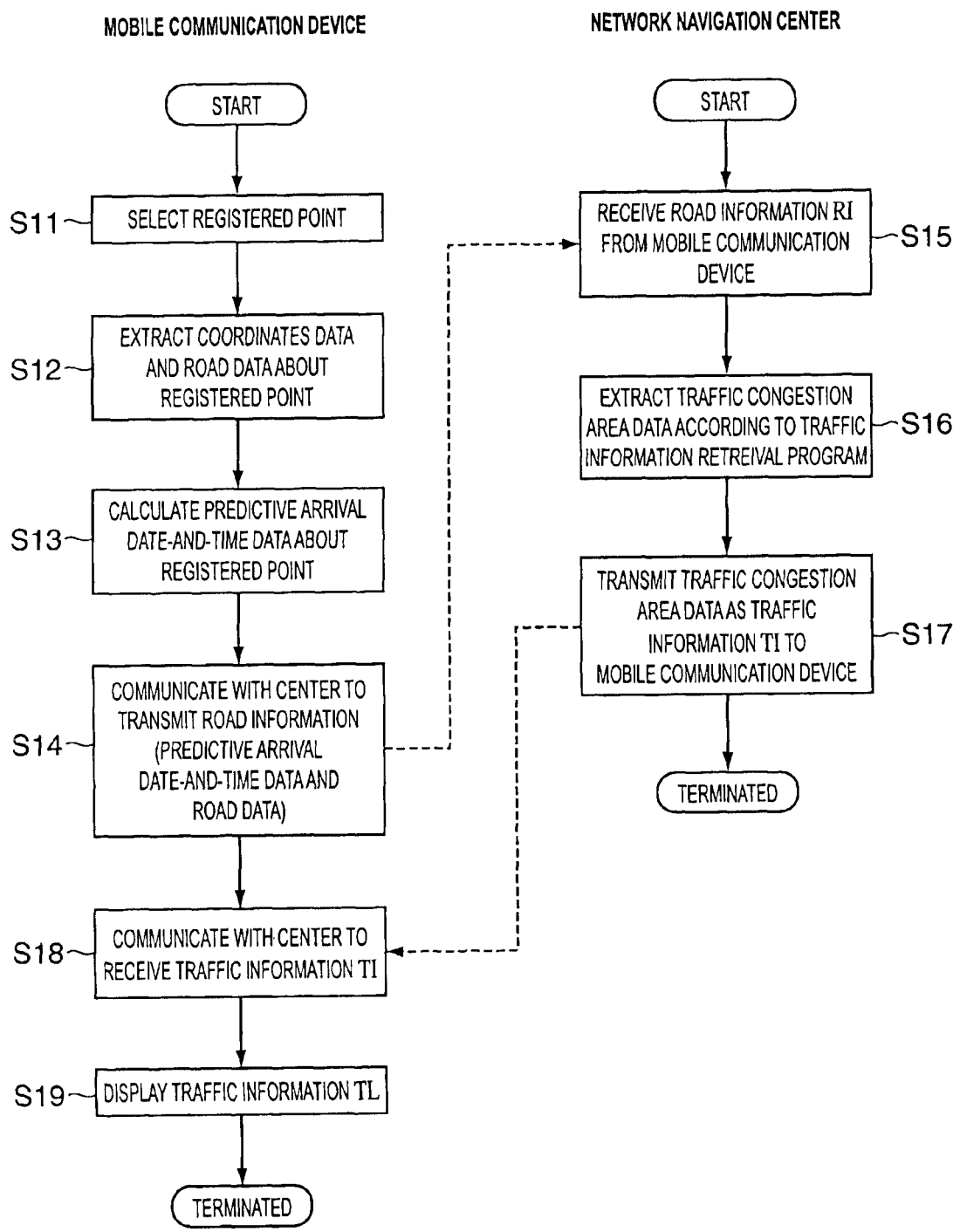
FIG. 4 is a flowchart showing processing interactively carried out between a mobile communication device and a network navigation center.
Figure 9:
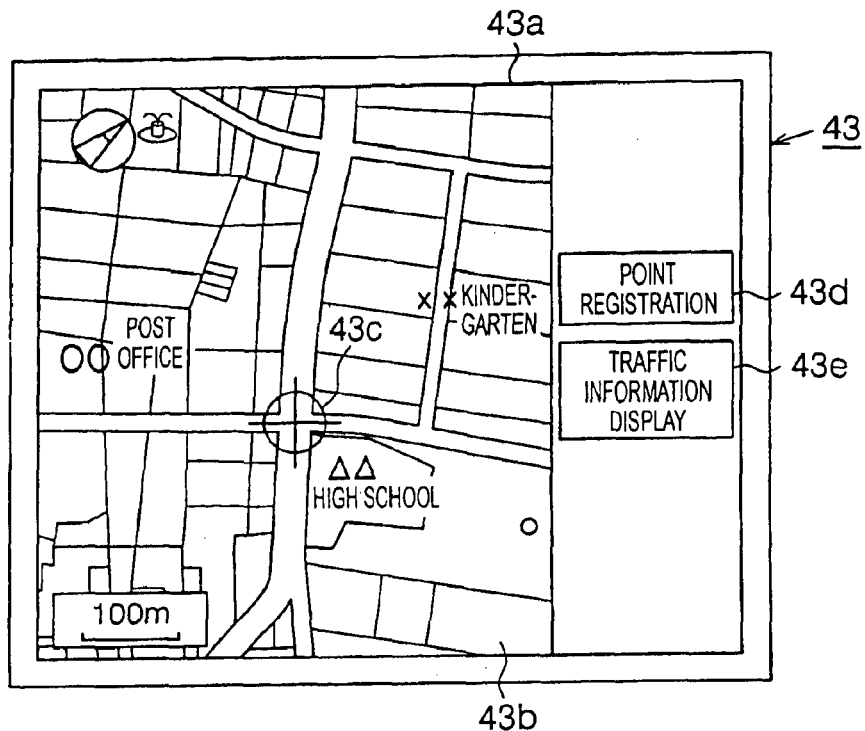
FIG. 9 illustrates a map and option buttons displayed on a screen.

Firstly, with reference to the flowchart in FIG. 4, the operations carried out between the center 10 and the apparatus 31 will be described. The operations are carried out in order to obtain the traffic information TI about a point (a registered point) desirably registered in the apparatus 31 by the user. First, based on operational signals from the key-switches 42, the CPU 53 in the apparatus 31 mounted on the vehicle 11 displays the map 43*b*, which covers the areas and ranges over which the user wants to check, on the screen 43*a* in the display 43 as shown in FIG. 9. Then, the user judges whether a point for which he/she wants to obtain the traffic information TI is included in the displayed map 43*b*. Subsequently, the operation goes to the input step. When the point for which the user wants to obtain the traffic information TI is included in the map 43*b*, the user manually operates the key-switches 42 to register the point as a registered point. The user locates the pointer 43*c* upon the point for which the traffic information TI is desired, and then selects a button 43*d* for the point registration.

Figure 10:
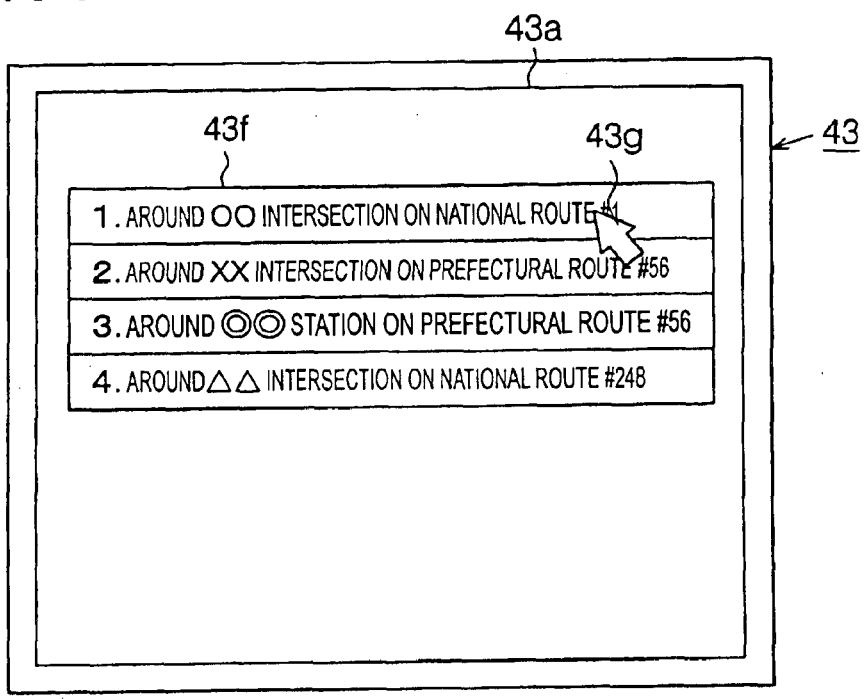
FIG. 10 illustrates a list displayed on a screen.

Upon the selection of the button 43*d*, input signals thereof are inputted into the CPU 53. Then, the operation goes to the positional information acquisition step. According to the point registration program, the CPU 53 detects the coordinates of the point on which the pointer 43*c* is imposed. Further then, from the intersection data and the road data stored in the device 34, the CPU 53 reads out a name of an intersection and a name of a road whose coordinates corresponding to the coordinates of the pointer-imposed point. In this connection, in the embodiment, the intersection name and the road name which are read out from the device 34 are displayed together as; "Around oo intersection on National Route #1" as shown in FIG. 10.

Then, the CPU 53 stores the name data about the intersection and the road which both read out from the device 34, and further stores coordinates data about said detected coordinates of the registered point. The name data and the coordinates data are stored together as registered point data in the device 34. The point registration program is then terminated. The registered point data may be accumulatively stored in the device 34 whenever the button 43*d* is selected.

When the user wants to obtain the traffic information TI about the point having the registered point data, the user needs only to manually operate the key-switches 42 and then select a button 43*e* for traffic information display provided on the screen 43*a*. Upon the selection of the button 43*e*, input signals thereof are inputted into the CPU 53. According to the traffic information acquisition program, the name data is readout from the device 34. Based on the readout name data, the CPU 53 displays a list 43*f* of the registered point names onto the screen 43*a* as shown in FIG. 10. In order to select the desirable registered point from the list 43*f*, the user needs only to manually operate the key-switches 42 to impose a cursor 43*g* on that desirable point name in the list 43*f* (Step S11).

After Step S11, the operational signals indicating the selection of the desired point name are inputted into the CPU 53. Thereby, according to the traffic information acquisition program, the coordinates data about the selected registered point is read out from the device 34. Then, based on the readout coordinates data, the CPU 53 extracts the road data about the road located within a three-kilometer range from the registered point. The extracted road data is then stored in the RAM 56 (Step S12).

After Step S12, the CPU 53 calculates the present position of the vehicle at intervals of the specified time and carries out the route search from the present position to the registered point according to the navigation program. Then, the operation goes to the predictive arrival date-and-time information computing step. The CPU 53 calculates the necessary time for traveling the searched route at a legal speed. Thereafter, based on the calculated necessary time and the present date-and-time, the CPU 53 further calculates the predictive arrival date-and-time when the vehicle will arrive at the registered point. The calculated predictive arrival date-and-time is stored in the RAM 56 as the predictive arrival date-and-time data serving as the predictive arrival date-and-time information (Step S13).

Then, according to the traffic information acquisition program, both the road data and the predictive arrival date-and-time data stored in the RAM 56 are outputted as the road information RI to the cellular phone 52. This output is carried out by the CPU 53 via the communication interface 61. In response to the output of the road information RI, the cellular phone 52 makes a call to the cellular phone base station 14. This induces the cellular phone 52 to communicate with the center 10 via the general telephone network 16. That is, the road information RI is transmitted from the cellular phone 52 to the center 10 (Step S14). The cellular phone number and the IP address of the cellular phone 52 together with the road information RI are transmitted to the center 10.

Upon receipt of the road information RI, the cellular phone number, and the IP address via the data-conversion device 22 (Step S15), the control server 25 in the center 10 judges, according to the traffic information retrieval program, whether both the inputted cellular phone number and the IP address belong to a user whose name is registered with the center 10. Specifically, the judgment is made by checking whether both the inputted cellular phone number and the IP address respectively match the cellular phone number and the IP address stored in the user data in the user server 23. If no match occurs, the control server 25 judges that the user is not registered with the center 10 and then goes to the state of waiting for the input of new road information RI.

If a match occurs, the control server 25 judges that the user is registered with the center 10. With this judgment, the operation goes to the predictive traffic information retrieval step. From the traffic information server 24, the control server 25 retrieves the predictive traffic congestion data that includes both the road data and the date-and-time data which respectively match the road data and the predictive arrival date-and-time data in the inputted road information RI. Next, the server 25 extracts the traffic congestion area data from the retrieved predictive traffic congestion data, and then stores the extracted traffic congestion area data into the storage unit of the control server 25 (Step S16).

Subsequently, according to the traffic information distribution program, the control server 25 carries out data conversion of the traffic information TI through the device 22 and then outputs the converted traffic information TI to the base station 14 via the network 16. Specifically, the traffic information TI outputted to the base station 14 is transmitted from the antenna 15 to the cellular phone 52 in the apparatus 31. On one side, when the transmission of the traffic information TI is terminated according to the traffic information distribution program, the control server 25 goes into the state of waiting for the input of the next road information RI (Step S17). On the other side, when the traffic information TI is received in the cellular phone 52, the CPU 53 temporarily stores that traffic information TI into the RAM 56 according to the traffic information acquisition program (Step S18).

Figure 11:
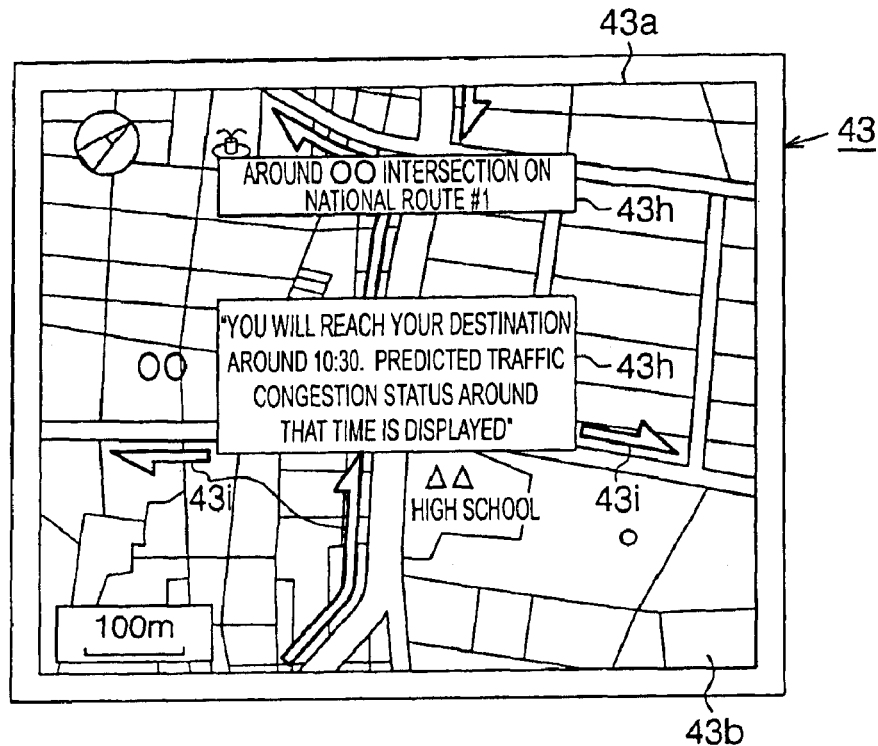
FIG. 11 illustrates one example of traffic information displayed on a screen.
Figure 12:
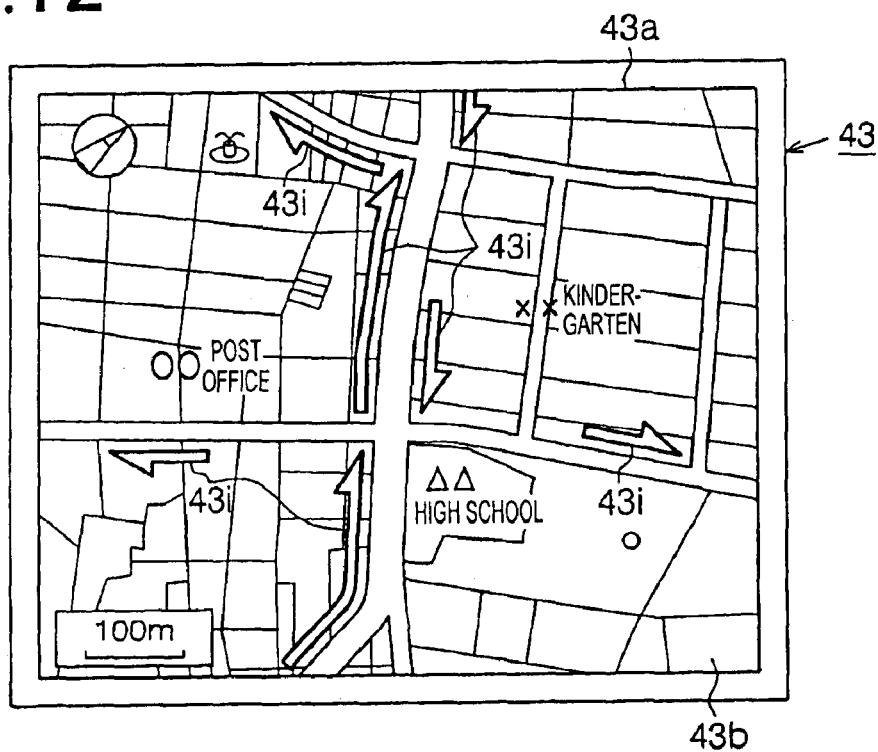
FIG. 12 illustrates another example of traffic information displayed on a screen.

After Step S18, the operation goes to the output step. The CPU 53 outputs the traffic information TI which is temporarily stored in the RAM 56 to the image processor 58. Then, the image processor 58 carries out the image-processing of the traffic information TI by using the display control signals from the CPU 53. Thereby, as shown in FIG. 11, the message box 43h is superimposed onto the map 43b that displays the area around the registered point. The message box 43h informs the user of the registered point name and the predictive arrival time. The display and non-display of the message box 43h onto the map 43b are then carried out at intervals of the specified time (in the embodiment for example, at a five-minute interval). On the map 43b, the navigational indicator 43i is displayed lining with the road direction, by which traffic congestion area is represented as shown in FIG. 11 and FIG. 12. As for FIG. 12, it shows the case where the message box 43h is not displayed for the user's benefit in viewing every navigational indicator 43i (S19).

To sum up, when the user presses the key-switches 42 to select the point which has already been registered on the screen 43b in the apparatus 31, both the road information RI and the traffic information TI are transmitted/received between the apparatus 31 and the center 10. After the transmission/receipt of the road information RI and the traffic information TI, the map 43b representing the area around the registered point is displayed onto the screen 43a as shown in FIG. 11 and FIG. 12. Further, the navigational indicator 43i representing the traffic congestion area on/at the predictive arrival date-and-time at which the registered point is reached by the present position is displayed onto the screen 43a together with the message box 43h which informs the user of the predictive arrival date-and-time. Accordingly, in order to spot the traffic congestion area on/at the predictive arrival date-and-time at which the registered point is reached by the present position, the user needs only to select his/her desired registered point from the list that contains the registered points which having already been registered.

Figure 5:
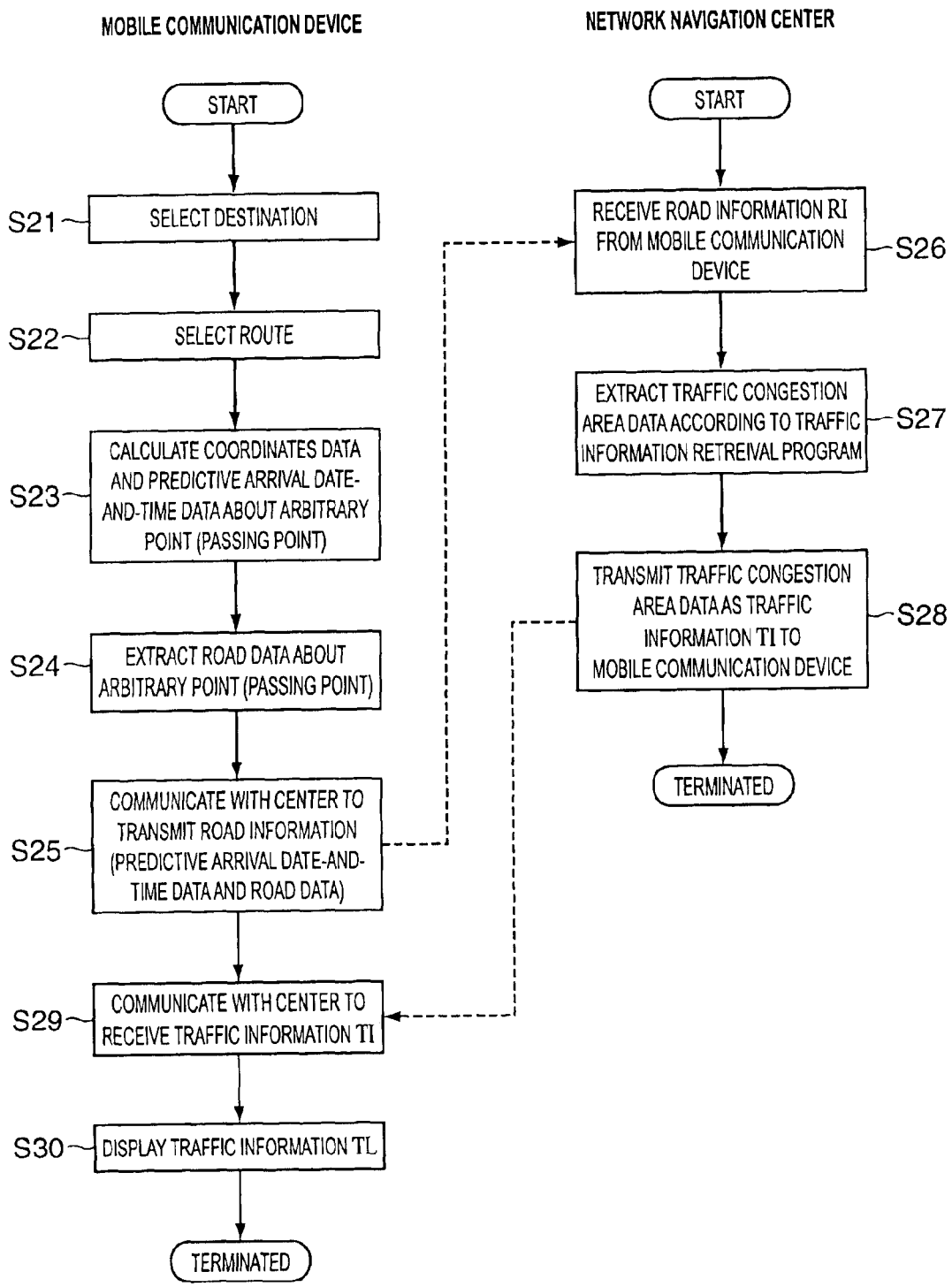
FIG. 5 is a flowchart showing processing interactively carried out between a mobile communication device and a network navigation center.

Next, with reference to the flowchart in FIG. 5, operations interactively carried out between the vehicle navigation apparatus 31 and the network navigation center 10 will be described. Hereafter, the apparatus 31 for obtaining the traffic information TI about passing points located on the route from the present position of the vehicle to the destination will be detailed.

Figure 13:
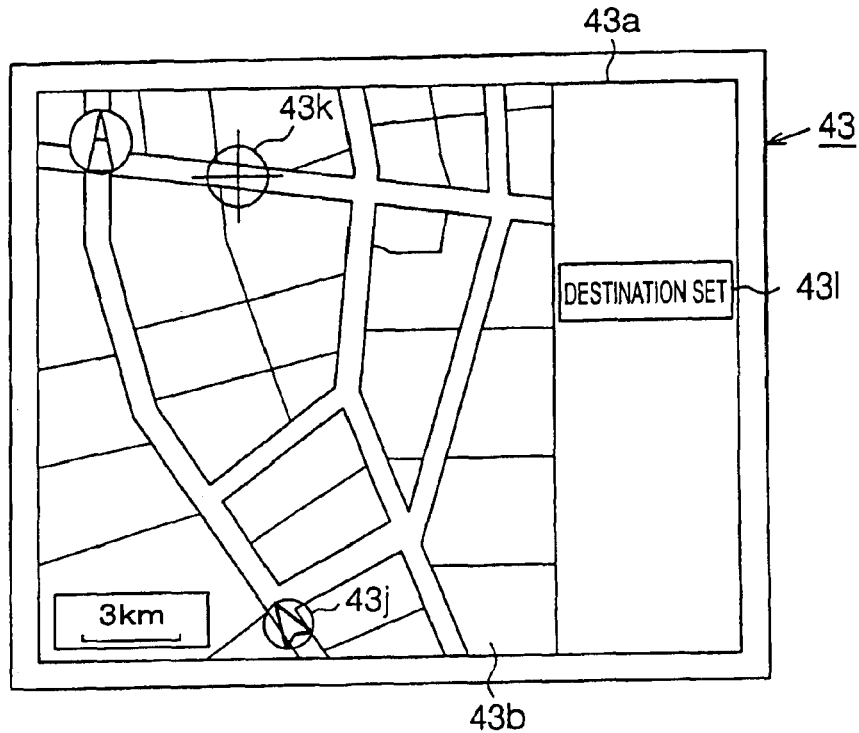
FIG. 13 illustrates a map and option buttons display on a screen.

The CPU 53 in the apparatus 31 mounted on the traveling vehicle 11 calculates the present position of the vehicle at intervals of specified time. As shown in FIG. 13, the CPU 53 lets the cursor 43j indicate the present position on the map 43b depicted on the screen 43a in the display 43. Viewing this screen, the user selects his/her destination by manually operating the key-switches 42.

In the input step, with the pointer 43k imposed on a point of the user-desired destination displayed on the map 43b, the button 43l is pressed to select the destination (Step S21). Upon selection of the destination, the operation goes to the route search step. The CPU 53 carries out the route search from the present position of the vehicle 11 to the destination, according to the navigation program. Although it is possible to search a plurality of routes in this search, the description of the present embodiment here takes the following case: only two time-optimal routes from the present position to the destination are searched. Route information about the searched two routes is temporarily stored in the RAM 56.

Figure 14:
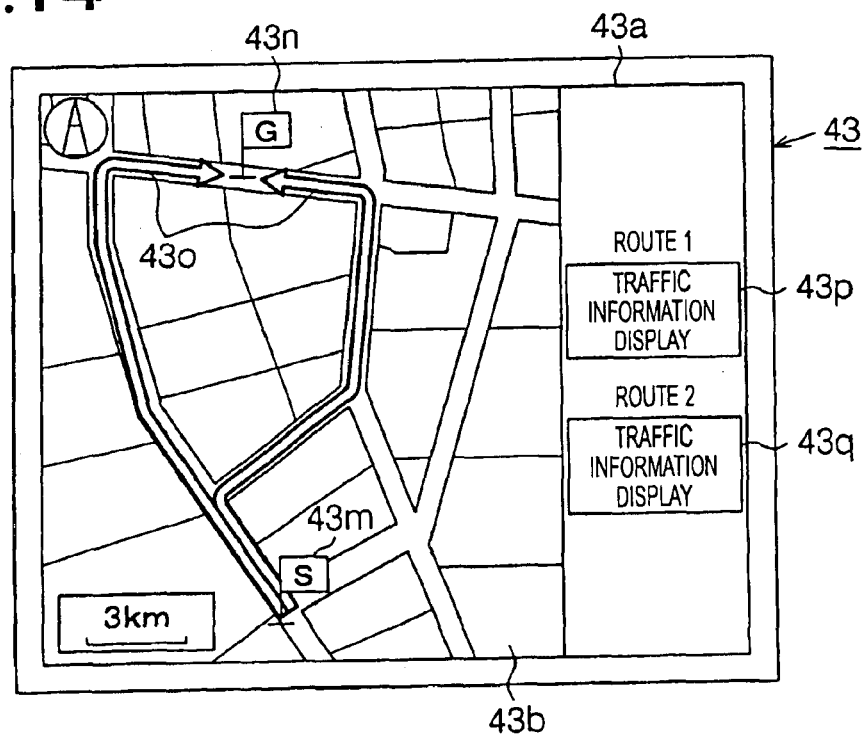
FIG. 14 illustrates an example of plural routes displayed on a screen.

The route information about the two searched routes, which are stored in RAM 56, is outputted to the image processor 58 by the CPU 53. By using the display control signals sent from the CPU 53, the image processor 58 carries out the image-processing of the route information and creates the image-processed route information to be displayed onto the map 43b as shown in FIG. 14. In the present embodiment, the map 43b includes a start flag 43m representing the present position of the vehicle, a goal flag 43n representing a destination, and a navigational indicator 43o representing the two routes based on said route information. Thereby, the user is given the map 43b depicted based on the route information. If the user wants to obtain the traffic information TI about any one of the two routes, a button 43p or a button 43q either correspondingly allocated to each route of the two routes is selected as desired by the user. In the present embodiment, the button 43q is pressed to select the user-desired route (Step S22).

Upon selection of the button 43q, according to the traffic information acquisition program, the CPU 53 calculates the necessary time for traveling the selected route from the present position to the destination. Then, according to the present date-and-time, the CPU 53 calculates the predictive arrival date-and-time when the user arrives at the destination. Here, the calculation is carried out based on the assumption that the selected route is traveled at a legal speed. After the calculation, the operation goes to the positional information acquisition step. Based on the calculated necessary time, the CPU 53 calculates the coordinates of an arbitrary point on the route to which it predictably takes thirty minutes to travel from the present position. The CPU 53 then calculates the coordinates of a next arbitrary point on the route to which it takes another thirty minutes to travel from the first arbitrary point. Coordinates data about every arbitrary point on the route from the present position to the destination is calculated at thirty-minute intervals. Subsequently, the operation goes to the predictive arrival date-and-time information computing step. Each predictive arrival date-and-time data about each predictive arrival date-and-time when the user reaches each point on the route is calculated and linked to its corresponding coordinates data. Then, the linked data is temporarily stored in the RAM 56 (Step S23).

After Step S23, the CPU 53 reads out, from the information storage device 34, the name of the road or the intersection that includes the arbitrary point. This readout is carried out based on the coordinates of the calculated arbitrary point on the route. Then, the readout name is linked to the corresponding coordinates data and then stored in the RAM 56. In addition, from the data stored in the device 34, the CPU 53 extracts, based on the calculated coordinates of the arbitrary point, the road data about the road which is located within three-kilometer range from the arbitrary point on the route. The extracted road data is also linked to the coordinates data and temporarily stored in the RAM 56 (Step S24).

Subsequently, according to the traffic information acquisition program, the road information RI, i.e., every road data and every predictive arrival date-and-time data stored in the RAM 56, is outputted by the CPU 53 to the cellular phone 52 via the interface 61. In response to the output of the road information RI from the CPU 53, the cellular phone 52 transmits that road information RI to the base station 14 and communicates with the center 10 via the network 16. Thereby, the road information RI is transmitted from the cellular phone 52 to the center 10 (Step S25). In such a case, the cellular phone number and the IP address of the cellular phone 52 together with the road information RI are transmitted to the center 10.

When the road information RI, the cellular phone number, and the IP address are transmitted via the device 22 to the control server 25 included in the center 10 (Step S26), the server 25 judges according to the traffic information retrieval program whether both the transmitted cellular phone number and the IP address belong to the user whose name is registered with the center 10.

In detail, the judgment is made by checking whether both the inputted cellular phone number and the IP address respectively match the cellular phone number and the IP address stored in the user data in the user server 23. If no match occurs, the server 25 judges that the user is not registered with the center 10 and then goes to the state of waiting for the input of new road information RI.

If a match occurs, the server 25 judges that the user is registered with the center 10. With this judgment, the operation goes to the predictive traffic information retrieval step. From the traffic information server 24, the server 25 retrieves the predictive traffic congestion data containing the road data and the date-and-time data which respectively matches the road data and predictive arrival date-and-time data which are both inputted as the road information RI. Further, the server 25 extracts the traffic congestion area data from the retrieved predictive traffic congestion data, and then stores the extracted traffic congestion area data into the storage unit of the server 25 (Step S27).

Thereupon, according to the traffic information distribution program, the control server 25 lets the data-conversion device 22 carry out the data conversion of the traffic information TI and then outputs the converted traffic information to the base station 14 via the network 16. Then, the traffic information TI outputted to the base station 14 is transmitted from the antenna 15 to the cellular phone 52 included in the apparatus 31. When the transmission of the traffic information TI according to the traffic information distribution program is terminated, the control server 25 goes to the state of waiting for the input of new road information RI (Step S28).

When the traffic information TI is received in the cellular phone 52, the CPU 53 links the received traffic information TI to the coordinates data and then temporarily stores the linked traffic information TI into the RAM 56 according to the traffic information acquisition program (Step S29).

After Step S29, the operation goes to the output step. The CPU 53 outputs the traffic information TI, the name data, and the predictive arrival time data about each passing point, which are all stored in the RAM 56, to the image processor 58. Such information and data are outputted in order of short-distance from the present position at intervals of the specified time (for example, at ten-minute intervals in the present embodiment). The image processor 58 carries out the image-processing of the traffic information TI by using the display control signals sent from the CPU 53 at the intervals of the specified time. Thereby the traffic information is displayed onto the display 43. As a result, the traffic information TI about each passing point is displayed one after the other at intervals of the specified time in order of short-distance from the present position.

Figure 15:
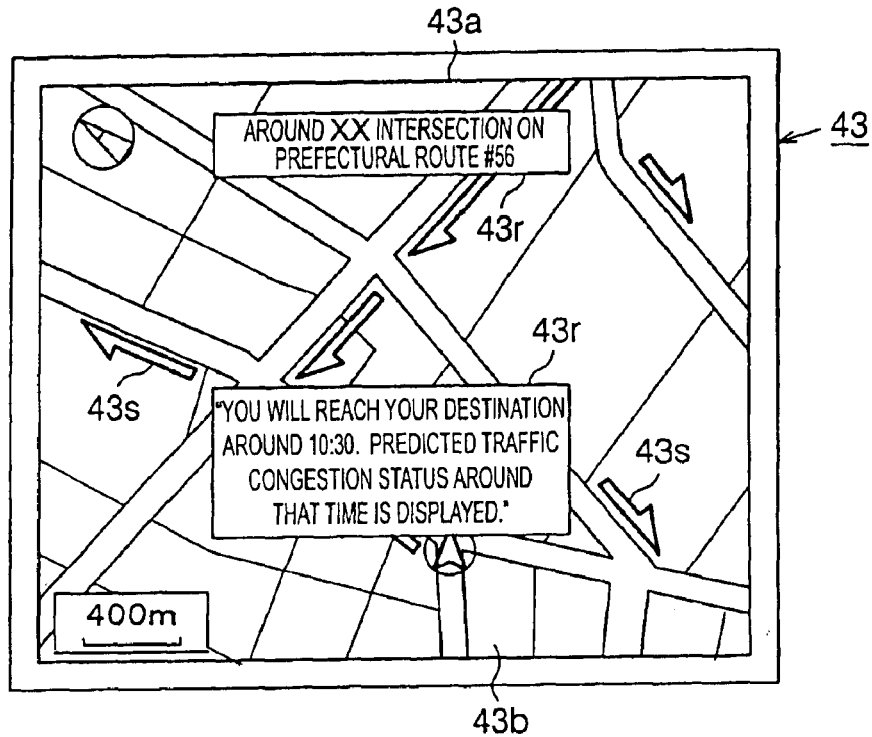
FIG. 15 illustrates another example of traffic information displayed on a screen.

As shown in FIG. 15, the map 43b representing the area around the passing point is displayed on the display 43. The message box 43r superimposed on the map 43b is displayed for only one specified time (for example, three seconds in the embodiment). This message box 43r informs the user of the name of a passing point and the predictive arrival time when the user arrives at that passing point. After the three seconds have passed, the message box 43r disappears for the user's benefit in viewing every navigational indicator 43i lining with the road, by which the traffic congestion area is represented. Subsequently, after ten seconds have passed from the display of the map 43b representing around the first passing point, the map is changed to the next map 43b representing around the next passing point. Upon displaying the next map 43b, the CPU 53 lets the image processor 58 display, in turn, every traffic information TI about every passing point onto the display 43. Thus, the traffic information acquisition program is terminated. (Step S30).

Figure 16:
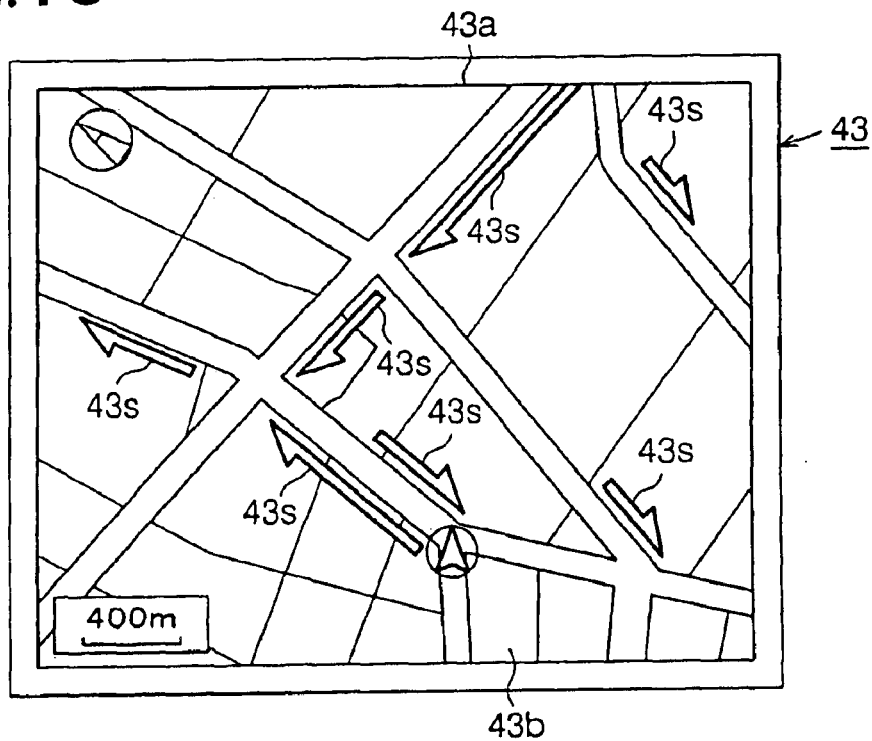
FIG. 16 illustrates yet another example of traffic information displayed on a screen.

To sum up, when the user presses the key-switch 42 to select a route from the present position to the destination, both the road information RI and the traffic information TI are transmitted/received between the vehicle navigation apparatus 31 and the network navigation center 10. After the transmission/receipt of the road information RI and the traffic information TI, the map 43b is displayed onto the screen 43a as shown in FIG. 15 and FIG. 16. In addition, both the navigational indicator 43s which represents the traffic congestion area on/at the predictive arrival date-and-time as well as the message box 43r which displays the predictive arrival date-and-time and the passing point name are displayed on the screen 43a. For every passing point, the map 43b, the navigational indicator 43s, and the message box 43r are displayed in order of short-distance from the present position. Accordingly, in order to spot every traffic congestion area around every passing point on the route from the present position to the destination, the user needs only to set destination and select one route from a plurality of routes running from the present position to the destination.

Figure 6:
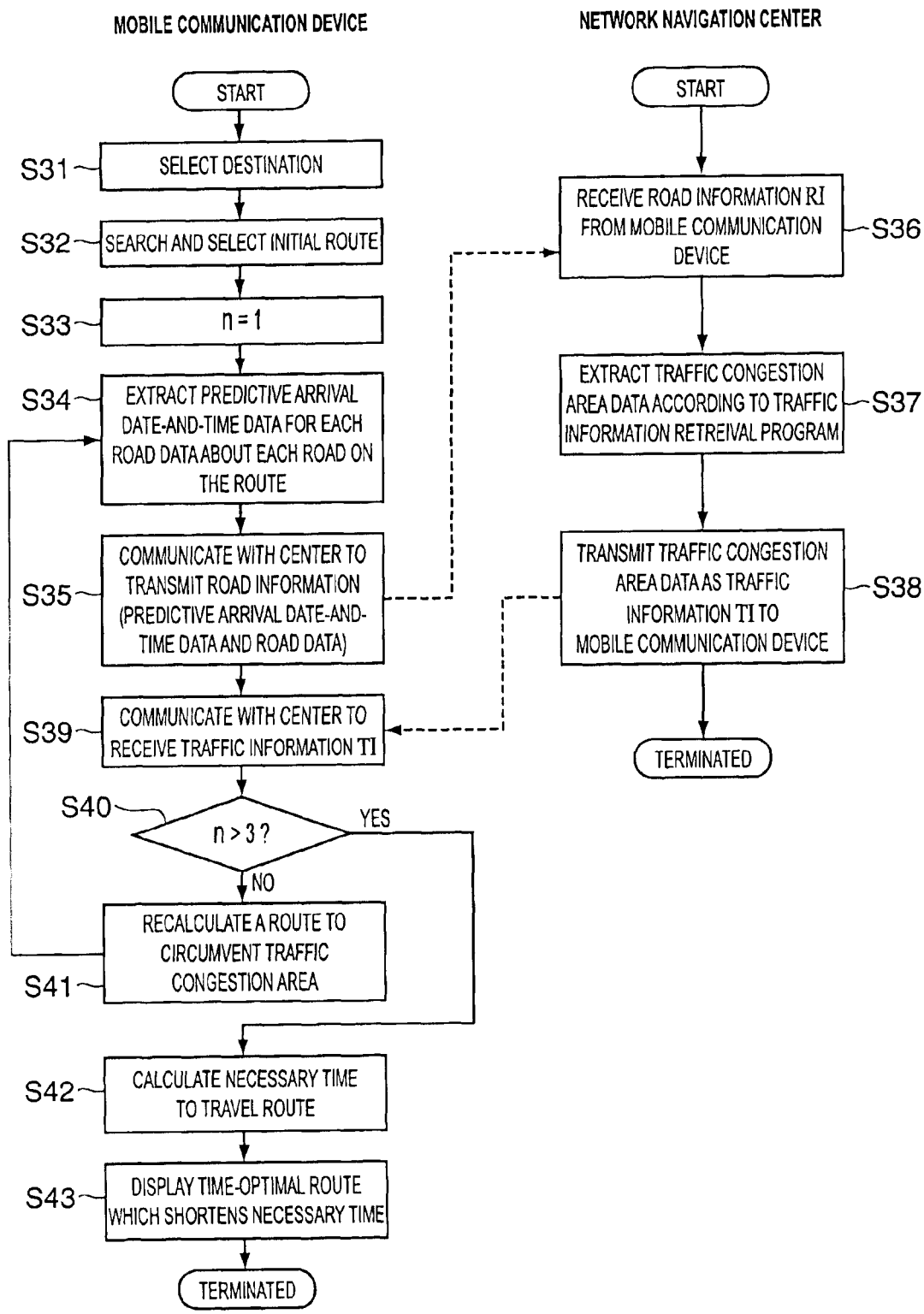
FIG. 6 is a flowchart showing processing interactively carried out between a mobile communication device and a network navigation center.

Next, with reference to a flowchart in FIG. 6, operations interactively carried out between the vehicle navigation apparatus 31 and the network navigation center 10 to determine a time-optimal route in view of delay time owing to the traffic congestion will be described.

In order to determine the time-optimal route, the CPU 53 in the apparatus 31 mounted on the traveling vehicle 11 first calculates the present position of the vehicle at intervals of specified time. Then, the user sets his/her destination by pressing the key-switches 42, wherein the CPU 53 is signaled to search the time-optimal route in view of the delay time owing to the traffic congestion (Step S31).

Figure 17:
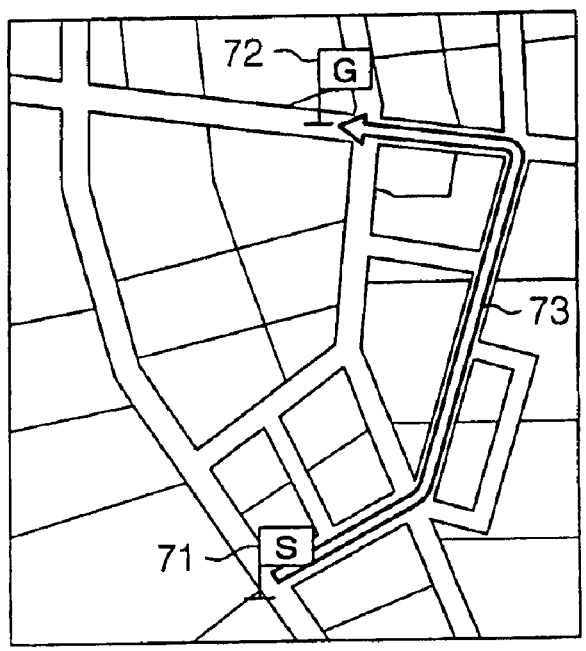
FIG. 17 illustrates the first step of processing a traffic congestion circumventive route search program.

Upon receiving that signal, the operation goes to the route search step. The CPU 53 carries out the route search from the present position 71 of the vehicle 11 to the destination 72 as shown in FIG. 17, according to the traffic congestion circumventive route search program. Although it is possible to search a plurality of routes in this route search, the description of the present embodiment here takes the following case: only one time-optimal route 73 from the present position to the destination is searched. This route search is carried out based on the assumption that the route is traveled at a legal speed. After the one route is searched, original route information about that searched route is temporarily stored in the RAM 56 (Step S32).

When the original route information is stored in the RAM 56, the CPU 53 stores the number of route searches (n) into the RAM 56 (Step S33), here that number is "1". Then, the operation goes to the positional information acquisition step and then goes to the predictive arrival date-and-time computing step. The CPU 53 extracts the road data and the predictive arrival date-and-time data about all roads on the route that is traveled at legal speed. The extracted data are stored as the road information RI into the RAM 56 (Step S34).

After Step S34, the road information RI, i.e. all road data and predictive arrival date-and-time data which both stored in the RAM 56, is outputted by the CPU 53 to the cellular phone 52 via the communication interface 61. In response to the output of the road information RI from the CPU 53, the cellular phone 52 transmits that road information RI to the base station 14 and communicates with the center 10 via the general telephone network 16. Thereby, the road information RI is transmitted from the cellular phone 52 to the network navigation center 10 (Step S35). The cellular phone number and the IP address of the cellular phone 52 together with the road information RI are transmitted to the center 10.

When the road information RI, the cellular phone number, and the IP address are transmitted via the device 22 to the control server 25 included in the center 10 (Step S36), the server 25 judges according to the traffic information retrieval program whether both the transmitted cellular phone number and the IP address belong to the user whose name is registered with the center 10. In particular, the judgment is made by checking whether both the inputted cellular phone number and the IP address respectively match the cellular phone number and the IP address stored in the user data in the user server 23.

If no match occurs, the server 25 judges that the user is not registered with the center 10 and then goes to the state of waiting for the input of new road information RI. If a match occurs, the server 25 judges that the user is registered with the center 10. Upon this judgment, the operation goes to the predictive traffic information retrieval step. From the traffic information server 24, the control server 25 retrieves the predictive traffic congestion data containing the road data and the date-and-time data which respectively match the road data and predictive arrival date-and-time data both inputted as the road information RI. Further, the server 25 extracts the traffic congestion area data from the retrieved predictive traffic congestion data, and then stores that extracted traffic congestion area data as the traffic information TI into the storage unit in the server 25 (Step S37).

Thereupon, according to the traffic information distribution program, the control server 25 lets the data-conversion device 22 carry out the data conversion of the traffic information TI and then outputs the converted traffic information to the cellular phone base station 14 via the network 16. Then, the traffic information TI outputted to the base station 14 is transmitted from the antenna 15 to the cellular phone 52 included in the apparatus 31. When the transmission of the traffic information TI according to the traffic information distribution program is terminated, the control server 25 goes to the state of waiting for the input of new road information RI (Step S38). When the traffic information TI is received in the cellular phone 52, the CPU 53 links the received traffic information TI to the road data and then temporarily stores that linked traffic information TI into the RAM 56 according to the traffic congestion circumventive route search program (Step S39).

Figure 18:
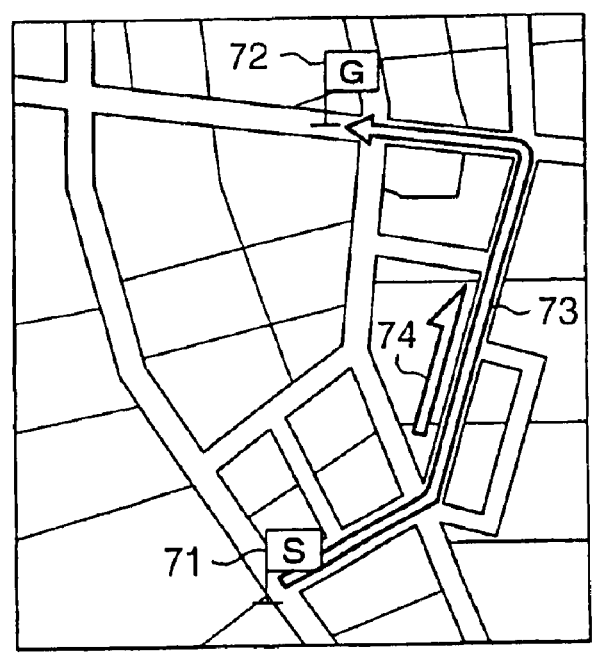
FIG. 18 illustrates the second step of processing a traffic congestion circumventive route search program.
Figure 19:
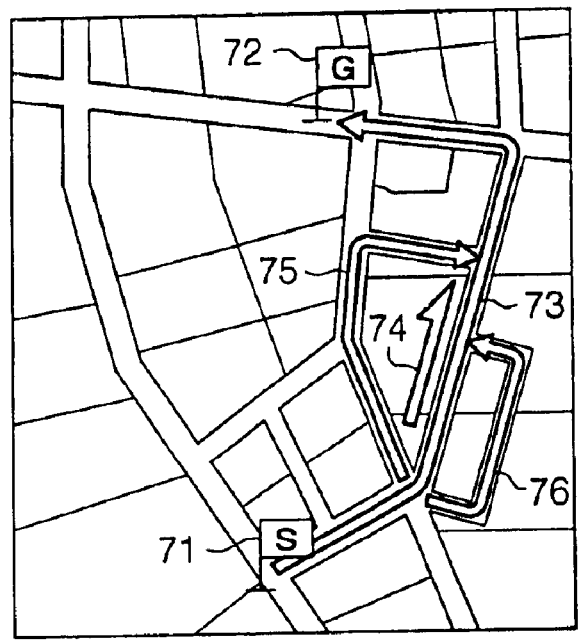
FIG. 19 illustrates the third step of processing a traffic congestion circumventive route search program.

Upon storing the traffic information TI into the RAM 56, the operation goes to Step S40. There, the CPU 53 judges whether the number of the route searches (n), which are stored in the RAM 56, is more than "3." If the number of the route searches is less than or equal to "3" ("NO" in Step S40), the operation goes to Step S41. Then, the CPU 53 recalculates, based on the traffic information TI stored in the RAM 56, the route to circumvent the traffic congestion area. For example, if there is a traffic congestion area 74 on a certain road section on the route as shown in FIG. 18, a new route 75 and 76 to circumvent the area 74 are searched as shown in FIG. 19.

Figure 20:
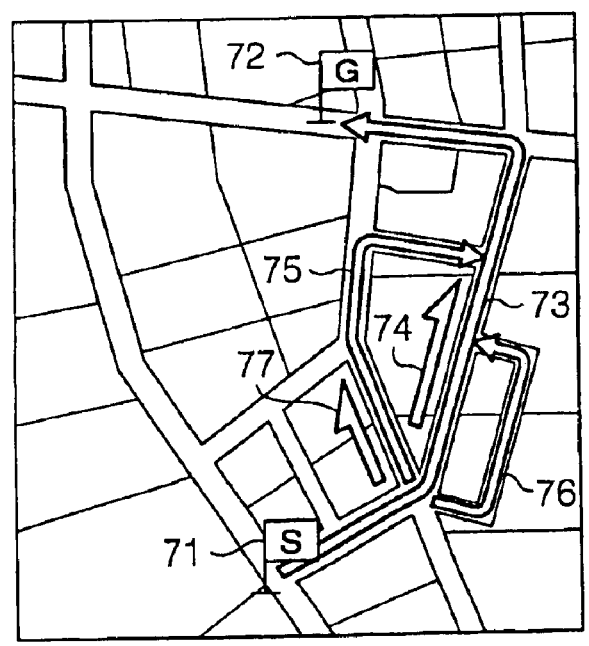
FIG. 20 illustrates the fourth step of processing a traffic congestion circumventive route search program.
Figure 21:
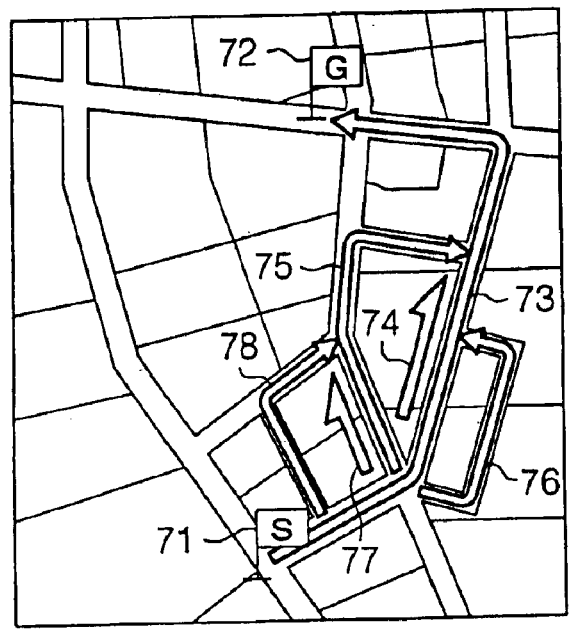
FIG. 21 illustrates the fifth step of processing a traffic congestion circumventive route search program.

After Step S40, the CPU 53 counts "1" as the number of the route searches. Then, the operation goes back to Step S34. The operations from Step S34 to Step S41 are repeated until Step S40 finds that the number of the route searches (n) becomes more than "3." If the new route 75 has a traffic congestion area 77 as shown in FIG. 20, a new route 78 to circumvent that area 77 is further searched as shown in FIG. 21. That is, the repetition of the route search (in the present embodiment; twice) can yield the optimum route to circumvent the traffic congestion area.

If the number of the route searches is more than "3" ("YES" in Step S40), the operation goes to Step S42. Then, the CPU 53 calculates the necessary time to travel every route searched (Step S42). Basically, the necessary time is calculated as follows: first, calculate the time required to travel the route at the legal speed. Then, to that calculated time, the delay time is added based on the delay-time data which represents the time required in getting out of the traffic congestion. This delay-time data is included in the traffic congestion area data distributed from the center 10. Accordingly, the time to get out of that traffic congestion is included in the necessary time for traveling the route in the case there is traffic congestion.

After calculating the necessary time for every searched route, the CPU 53 extracts the time-optimal route. Then, the operation goes to the output step in which the time-optimal route is outputted to the image processor 58. There, by using the display control signals sent from the CPU 53, the time-optimal route is displayed onto the display 43. In detail, as shown in FIG. 22, the map 43*b* is displayed on the display 43. Onto that map 43*b*, the navigational indicator 43*t* that indicates the time-optimal route is superimposed. Further in detail, this display of the map 43*b* is carried out by the CPU 53 that lets the image processor 58 impose the navigational indicator 43*t* onto the display 43. Thus, the traffic congestion circumventive route search program is terminated. (Step S43).

To sum up, when the user presses the key-switches 42 to select a route from the present position to the destination on the screen 43*a*, both the road information RI and the traffic information TI are transmitted/received between the vehicle navigation apparatus 31 and the network navigation center 10. After the transmission/receipt of the road information RI and the traffic information TI, the map 43*b* is displayed onto the screen 43*a* as shown in FIG. 22. In addition to that, the navigational indicator 43*t* which indicates the time-optimal route in view of the delay time owing to the traffic congestion is displayed on the screen 43*a*. Accordingly, in order to precisely obtain the time-optimal route from the present position to the destination, the user merely needs to select and set the destination. Thus, the most serviceable route is provided for the user.

Figure 7:
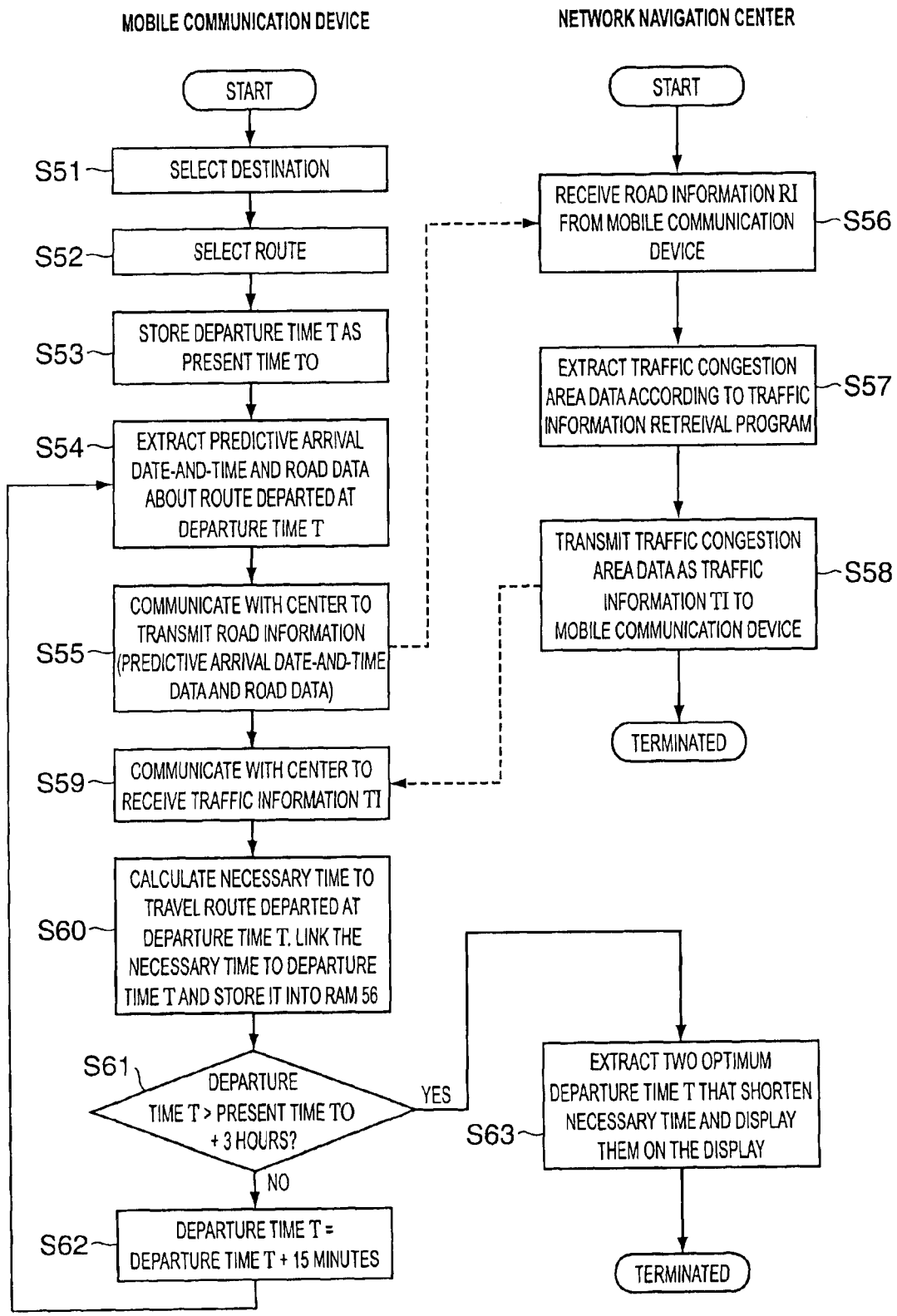
FIG. 7 is a flowchart showing processing interactively carried out between a mobile communication device and a network navigation center.

Further, with reference to a flowchart in FIG. 7, operations interactively carried out between the vehicle navigation apparatus 31 and the network navigation center 10 to determine the optimum departure time for setting out for the destination from the present position will be described. In order to determine the optimum departure time, firstly, the CPU 53 in the apparatus 31 mounted on the traveling vehicle 11 calculates the present position of the vehicle at intervals of specified time. Then, the user sets his/her destination by pressing the key-switch 42, whereby the CPU 53 is signaled to calculate the optimum departure time for setting out for the destination from the present position (Step S51).

Upon that signal, the operation goes to the route search step. The CPU 53 carries out the route search from the present position of the vehicle 11 to the destination, according to the departure time determination program. Although it is possible to search a plurality of routes in this route search, the description of the present embodiment here takes the following case: only one time-optimal route from the present position to the destination is searched. The route search is carried out based on the assumption that the route is traveled at a legal speed. Route information about that searched one route is temporarily stored in the RAM 56 (Step S52).

Upon storage of the route information into the RAM 56, the CPU 53 stores departure time T, i.e., present time TO (for example, AM 7:30) into the RAM 56 (Step S53). Then, the operation goes to the positional information acquisition step and then goes to the predictive arrival date-and-time computing step. The CPU 53 extracts the road data about every road on the route and also extracts the predictive arrival date-and-time data in the case of the route being set off at the departure time T as well as being traveled at the legal speed. Both of the extracted data are stored as the road information RI into the RAM 56 (Step S54).

After Step S54, the road information RI, i.e., every road data and predictive arrival date-and-time data which are both stored in the RAM 56, is outputted by the CPU 53 to the cellular phone 52 via the interface 61. In response to the output of the road information RI from the CPU 53, the cellular phone 52 transmits that road information RI to the base station 14 and communicates with the center 10 via the general telephone network 16. Thereby, the road information RI is transmitted from the cellular phone 52 to the center 10 (Step S55). In such a case, the cellular phone number and the IP address of the cellular phone 52 together with the road information RI are transmitted to the center 10.

When the road information RI, the cellular phone number, and the IP address are transmitted via the device 22 to the control server 25 included in the center 10 (Step S56), the server 25 judges, according to the traffic information retrieval program, whether both the transmitted cellular phone number and the IP address belong to the user whose name is registered with the center 10. In detail, the judgment is made by checking whether both of the inputted cellular phone number and the IP address respectively match the cellular phone number and the IP address in the user data stored in the user server 23. If no match occurs, the server 25 judges that the user is not registered with the center 10, and then goes to the state of waiting for the input of new road information RI.

If a match occurs, the server 25 judges that the user is registered with the center 10. With this judgment, the operation goes to the predictive traffic information retrieval step. From the traffic information server 24, the server 25 retrieves the predictive traffic congestion data which contains the road data and the date-and-time data that respectively match the road data and predictive arrival date-and-time data which are both inputted as the road information RI. Further, the server 25 extracts the traffic congestion area data from the retrieved predictive traffic congestion data, and then stores that extracted traffic congestion area data as the traffic information TI into the storage unit in the server 25 (Step S57).

Thereupon, according to the traffic information distribution program, the control server 25 lets the device 22 carry out the data conversion of the traffic information TI and then outputs the converted traffic information to the base station 14 via the network 16. Then, the traffic information TI outputted to the base station 14 is transmitted from the antenna 15 to the cellular phone 52 included in the apparatus 31. When the transmission of the traffic information TI according to the traffic information distribution program is terminated, the server 25 goes to the state of waiting for the input of the new road information RI (Step S58). When the traffic information TI is received in the cellular phone 52, the CPU 53 links the received traffic information TI to the road data and then temporarily stores the linked traffic information TI into the RAM 56 according to the departure time determination program (Step S59).

Upon storage of the traffic information TI into the RAM 56, the operation goes to Step S60. There, the CPU 53 calculates the necessary time for traveling the route that is set off at the departure time T. Basically, such necessary time is calculated as follows: first, the time required to travel the route at a legal speed is calculated. Then, to that calculated time, the delay time is added based on the delay-time data which represents the time required in getting out of the traffic congestion. This delay-time data is included in the traffic congestion area data. Upon the calculation of the necessary time, the CPU 53 links that calculated necessary time to the departure time T and stores the linked calculated necessary time into the RAM 56 (Step S60).

Subsequently, the operation goes to Step S61. There, the CPU 53 judges whether the departure time T is later than "Present time TO+Three hours." If the departure time T is earlier than "Present time TO+Three hours" ("NO" in Step S60), the operation goes to Step S62. There, new departure time T is arranged by adding fifteen minutes to the departure time T (Step S62).

After Step S62, the operation goes back to Step S54. The operations from Step S54 to Step S62 are repeated until Step S61 finds that the departure time T becomes later than "Present time TO+three hours." As a result, every necessary time for traveling the route departed at every departure time varied at fifteen-minute intervals for three hours from the present departure time is stored into the RAM 56. If the number of the departure time T is later than "Present time PO+three hours" ("YES" in Step 61), the operation goes to Step 63. In Step 63, the CPU 53 compares every necessary time for traveling the route departed at every departure time T, which has been calculated, with one another. Then, the CPU 53 extracts the first optimum departure time T and the second optimum departure time T which minimize the necessary time for traveling the route. After Step S63, the operation goes to the output step. There, the CPU 53 outputs the two optimum departure times T and the respective necessary time based thereon to the image processor 58. By using the display control signals sent from the CPU 53, the outputted two optimum departure times T and the respective necessary time based thereon are displayed on the display 43.

In detail, as shown in FIG. 23, the map 43b is displayed on the display 43. Onto that map 43b, the navigational indicator 43u indicating the route is superimposed. Further, on the right side of the screen, the message box 43v is displayed. This message box shows the first optimum departure time T and the second optimum departure time T together with the respective necessary time to travel the route. After the navigational indicator 43u and the message box 43v are displayed onto the display 43 by the image processor 58 (Step S63), the CPU 53 terminates the departure time determination program.

To sum up, when the user presses the key-switch 42 to select a route from the present position to the destination on the screen 43a, both the road information RI and the traffic information TI are transmitted/received between the vehicle navigation apparatus 31 and the network navigation center 10. After the transmission/receipt of the road information RI and the traffic information TI, the map 43b is displayed onto the screen 43a as shown in FIG. 23. In addition, both the first optimum departure time T and the second optimum departure time T together with each necessary time for traveling the route departed at each optimum departure time T are displayed on the screen 43a. Accordingly, in order to know precisely the optimum departure time that minimizes the necessary time for traveling the route from the present position to the destination, the user merely needs to select and set the destination. Thus, the optimum departure time is provided for the operator.

Figure 8:
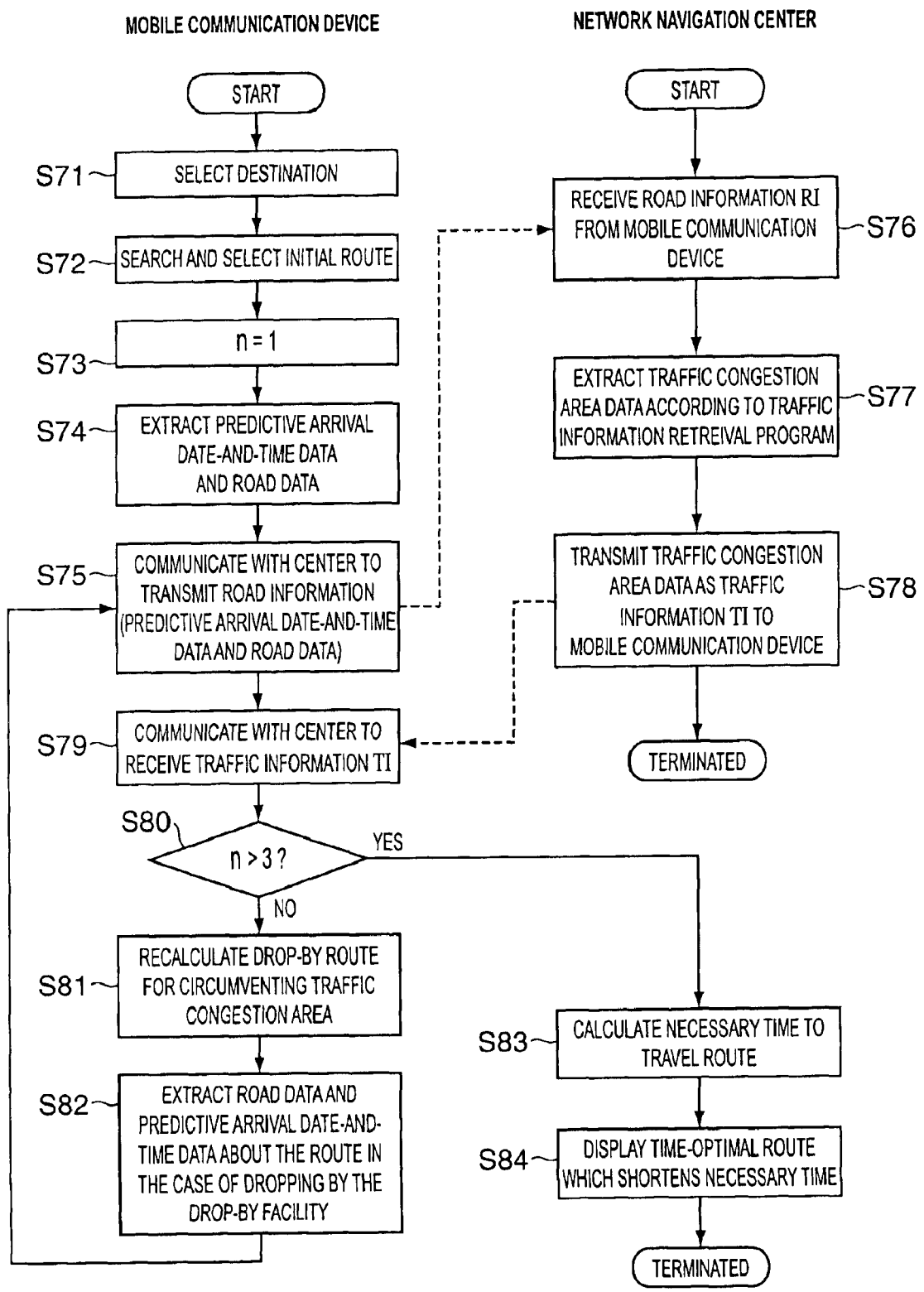
FIG. 8 is a flowchart showing processing interactively carried out between a mobile communication device and a network navigation center.

Further next, with reference to a flowchart in FIG. 8, operations interactively carried out between the vehicle navigation apparatus 31 and the network navigation center 10 to determine a drop-by route for circumventing the traffic congestion will be described. In order to determine the drop-by route for circumventing the traffic congestion, firstly, the CPU 53 in the apparatus 31 mounted on the traveling vehicle 11 calculates the present position of the vehicle at intervals of specified time. Then, the user sets his/her destination by pressing the key-switch 42, by which the CPU 53 is signaled to search the drop-by route for circumventing the traffic congestion (Step S71).

Upon that signal, the operation goes to the route search step. The CPU 53 carries out the route search from the present position of the vehicle 11 to the destination, according to the drop-by route search program. Although it is possible to search a plurality of routes in this route search, the description of the present embodiment here takes the following case: only one drop-by route from the present position to the destination is searched. The drop-by route search is carried out based on the assumption that the route is traveled at a legal speed. Original route information about that searched one drop-by route is temporarily stored into the RAM 56 (Step S72).

When the original route information is stored into the RAM 56, the CPU 53 stores the number of route searches (n) into the RAM 56 (Step S73). Here that number is "1". Then, the operation goes to the positional information acquisition step and then goes to the predictive arrival date-and-time computing step. The CPU 53 extracts the road data about every road on the route and the predictive arrival date-and-time data in the case that the route is being traveled at a legal speed. The extracted data is stored as the road information RI into the RAM 56 (Step S74).

After Step S74, the road information RI, i.e., every road data and predictive arrival date-and-time data which are both stored in the RAM 56, is outputted by the CPU 53 to the cellular phone 52 via the communication interface 61. In response to the output of the road information RI from the CPU 53, the cellular phone 52 transmits that road information RI to the base station 14 and communicates with the center 10 via the general telephone network 16. Thereby, the road information RI is transmitted from the cellular phone 52 to the network navigation center 10 (Step S75). In such case, the cellular phone number and the IP address of the cellular phone 52 together with the road information RI are transmitted to the center 10.

When the road information RI, the cellular phone number, and the IP address are transmitted via the data-conversion device 22 to the control server 25 in the center 10 (Step S76), the server 25 judges according to the traffic information retrieval program whether both the transmitted cellular phone number and the IP address belong to the user whose name is registered with the center 10. In detail, the judgment is made by checking whether both of the inputted cellular phone number and the IP address respectively match the cellular phone number and the IP address in the user data stored in the user server 23.

If no match occurs, the server 25 judges that the user is not registered with the center 10, and then goes to the state of waiting for the input of the new road information RI. If a match occurs, the server 25 judges that the user is registered with the center 10. Upon this judgment, the operation goes to the predictive traffic information retrieval step. From the traffic information server 24, the control server 25 retrieves the predictive traffic congestion data containing the road data and the date-and-time data which respectively match the road data and predictive arrival date-and-time data both inputted as the road information RI. Further, the server 25 extracts the traffic congestion area data from the retrieved predictive traffic congestion data, and then stores that extracted traffic congestion area data as the traffic information TI into the storage unit in the server 25 (Step S77).

Thereupon, according to the traffic information distribution program, the control server 25 lets the device 22 carry out the data conversion of the traffic information TI and then outputs the converted traffic information to the cellular phone base station 14 via the network 16. Then, the traffic information TI outputted to the base station 14 is transmitted from the antenna 15 to the cellular phone 52 included in the apparatus 31. When the transmission of the traffic information TI according to the traffic information distribution program is terminated, the control server 25 goes to the state of waiting for the input of the new road information RI (Step S78). When the traffic information TI is received in the cellular phone 52, the CPU 53 links the received traffic information TI to the road data and then temporarily stores the linked traffic information TI into the RAM 56 according to the drop-by route search program (Step S79).

Upon storage of the traffic information TI into the RAM 56, the operation goes to Step S80. There, the CPU 53 judges whether the number of the route searches (n), which are stored in the RAM 56, is more than "3." If the number of the route searches is less than or equal to "3" ("NO" in Step S80), the operation goes to Step S81. Then, the CPU 53 recalculates, based on the traffic information TI stored in the RAM 56, the drop-by route for circumventing the traffic congestion area (Step S81). In detail, the CPU 53 refers to the drop-by facility data stored in the information storage device 34 and retrieves from the road data the drop-by facility located within the specified distance from the route on which there is the traffic congestion area. Here the road data is the data about the road which is included in the traffic congestion area on the route.

Subsequently, the CPU 53 calculates the road data about the roads that make up the drop-by route. At the same time, the predictive arrival date-and-time data about each road, in the case of the drop-by route being traveled at a legal speed as well as in the case of certain time being passed at the drop-by facility (for example, pass the time for thirty minutes in the park), is also calculated by the CPU 53. Then, the CPU 53 counts "1" as the number of the route searches (Step S82). Thereupon, the operation goes back to Step 75. The operations from Step S75 to Step S82 are repeated until Step 80 finds that the number of the route searches (n) becomes more than "3."

If the number of the route searches is more than "3" ("YES" in Step S80), the operation goes to Step S83. Then, the CPU 53 calculates every travel time and the necessary time for traveling every route being searched so far (Step S83). Here, basically such travel time is calculated as follows: the time required to travel the route at legal speed is calculated. Then, to that calculated time, add the delay time based on the delay-time data which represents the time required in getting out of the traffic congestion is added. This delay-time data is included in the traffic congestion area data. Furthermore, the necessary time is calculated by adding drop-by time (for example, thirty minutes during which the user passes the time in the park) to said travel time.

After the calculation of the travel time and the necessary time for every searched route, the CPU 53 extracts the time-optimal route. Then, the operation goes to the output step where two routes are outputted to the image processor 58. One is the original route with no dropping-by, and another is the time-optimal drop-by route that minimizes the travel time by dropping-by. Based on the display control signals sent from the CPU 53, the two routes are displayed on the display 43 at the same time.

In detail, as shown in FIG. 24, the map 43b is displayed on the display 43. Onto that map 43b, the navigational indicator 43w indicating the original route and the navigational indicator 43x indicating the drop-by route are superimposed. Further, on the right side of the display 43, the message box 43z is displayed. This message box shows the travel time by the original route, the travel time by the drop-by route, the name of the drop-by facility, and the drop-by time. When the navigational indicator 43w, 43x, 43y and the message box 43v are displayed onto the display 43 by the image processor 58, the CPU 53 terminates the drop-by route search program (Step S84).

To sum up, when the user presses the key-switch 42 to select a route from the present position to the destination on the screen 43a, both the road information RI and the traffic information TI are transmitted/received between the vehicle navigation apparatus 31 and the network navigation center 10. After the transmission/receipt of the road information RI and the traffic information TI, the map 43b is displayed onto the screen 43a as shown in FIG. 24. In addition, the navigational indicator 43w which indicates the original route, the navigational indicator 43x which indicates the drop-by route, the navigational indicator 43y which indicates the drop-by facility, and the message box 43z are also displayed on the screen 43a. Accordingly, to know precisely the drop-by route for circumventing the traffic congestion, the user merely needs to select and set the destination. Thus, the most serviceable route is provided for the user.

As set forth hereinabove, the embodiments with above-mentioned elements will be characterized as follows. In the aforementioned embodiments, when the user selects the point which has already been registered in the vehicle navigation apparatus 31, the road information RI is transmitted from the apparatus 31 to the center 10. Then, according to the transmitted road information RI, the center 10 retrieves, from the traffic information server 24, the traffic congestion area data included in the predictive traffic congestion data. The retrieved traffic congestion area data is transmitted as the traffic information TI to the apparatus 31.

When the traffic information TI is transmitted to the apparatus 31, the map 43b which represents the area around the registered point is displayed on the display 43 in the apparatus 31. Thereupon, the navigational indicator 43i is also displayed onto the display 43. This navigational indicator 43i represents the traffic congestion area that emerges on the route between the present position and the registered point for which the predictive arrival date-and-time is predicted. Accordingly, if the user wants to know the traffic congestion area that emerges on the route between the present position and the registered point for which the predictive arrival date-and-time is predicted, the user merely needs to preset at least one point as the registered point and select one registered point from the preset registered points.

In the aforementioned embodiments, the navigational indicator 43i representing the traffic congestion area that emerges on the route between the present position and the registered point for which the predictive arrival date-and-time being predicted is displayed on the display 43. At the same time, together with the navigational indicator 43i, the message box 43h which informs the user of the registered point name and the predictive arrival date-and-time when the user reaches the registered point is displayed onto the display 43. This simultaneous display provides the user with clear confirmation of the traffic-congested point on the route and the traffic congestion time.

In the aforementioned embodiments, when the user selects a route running from the present position to the destination, the road information RI about an arbitrary point (passing point) on the selected route is transmitted from the apparatus 31 to the center 10. Then, according to the transmitted road information RI, the center 10 retrieves from the traffic information server 24 the traffic congestion area data included in the predictive traffic congestion data. The retrieved traffic congestion area data is transmitted as the traffic information TI to the apparatus 31.

When the traffic information TI is transmitted to the apparatus 31, the map 43b which represents the area around the arbitrary point on the selected route is displayed on the display 43 in the apparatus 31. Thereupon, the navigational indicator 43s is also displayed onto the display 43. This navigational indicator 43s represents each traffic congestion area that emerges on each route between the present position and each arbitrary point for which the predictive arrival date-and-time is predicted. Accordingly, if the user wants to know each traffic congestion area that emerges on each route between the present position and each registered point for which the predictive arrival date-and-time is predicted, the user merely needs to preset his/her destination and select one route from a plurality of routes which runs from the present position to the destination.

In the aforementioned embodiments, the navigational indicator 43s representing the traffic congestion area that emerges on the route between the present position and the arbitrary point for which the predictive arrival date-and-time being predicted is displayed on the play 43. At the same time, together with the navigational indicator 43s, the message box 43r which informs the user of the arbitrary point name and the predictive arrival date-and-time when the user reaches the arbitrary point is displayed onto the display 43. This simultaneous display provides the user with clear confirmation of the traffic-congested arbitrary point on the route and the traffic congestion time.

In the aforementioned embodiment, for every arbitrary point, the navigational indicator 43s and the message box 43r are displayed at intervals of the specified time in order of short-distance from the present position. That is, the user can check the navigational indicator 43s and the message box 43r in order of passing from the arbitrary points. This allows the user to readily confirm the traffic-congested arbitrary point on the route and the traffic congestion time.

In the aforementioned embodiments, when the user sets his/her destination and the system is signaled to search a time-optimal route in view of the delay time owing to the traffic congestion, the road information RI about that original searched route is extracted according to the traffic congestion circumventive route search program. Then, the traffic information TI that corresponds to the road information RI is obtained. If there is the traffic congestion area on the original searched route, another route to circumvent that congestion area is re-searched. Further, if there is the traffic congestion area on that another searched route, a next route to circumvent that congestion area is further re-searched. This re-searching routine is repeated twice. For every searched route, the necessary time for traveling is calculated. From the searched routes with the necessary time calculated, the time-optimal route is selected. The selected time-optimal route is represented by the navigational indicator 43*t* and displayed onto the display 43. Accordingly, if the user wants to know precisely the time-optimal route that minimizes the necessary time for traveling from the present position to the destination, the user merely needs to select and set the destination. Thus, the most serviceable route is provided for the user.

In the aforementioned embodiments, when the user sets his/her destination and the system is signaled to calculate optimum departure time for setting for the route from the present position to the destination, the road information RI about that route is extracted for each different departure time T, according to the departure time determination program. Then, the traffic information TI that corresponds to the road information RI is obtained for each different departure time T. Further, for each departure time T, the necessary time for traveling the route departed at each departure time T is calculated based on the traffic information TI. From the departure time T with the necessary time calculated, the optimum departure time is selected. The selected optimum departure time is displayed in the message box 43*v* shown on the display 43. Accordingly, if the user wants to know precisely the optimum departure time that minimizes the necessary time for traveling from the present position to the destination, the user merely needs to select and set the destination. Thus, the most serviceable departure time is provided for the user.

In the aforementioned embodiments, when the user sets his/her destination and the system is signaled to search a drop-by route for circumventing the traffic congestion, the road information RI about the original searched route to the destination is extracted according to the drop-by route search program. Then, the traffic information TI that corresponds to the road information RI is obtained. If there is the traffic congestion area on the original searched route, the drop-by data about the drop-by facility located within the specified distance from the traffic-congested road on the route is retrieved. After the retrieval of the drop-by data, another route is re-searched. This searched route is such that the user drops by and passes the time at the drop-by facility on his/her way to the destination. Further, if there is the traffic congestion area on that searched route, a new route for circumventing the congestion area is further re-searched. This re-searching routine is repeated twice. For every searched route, both the travel time and the necessary time for traveling the route are calculated. Then, onto the display 43, the navigational indicator 43*x* representing the drop-by route for circumventing the traffic congestion as well as minimizing the necessary time is displayed together with the navigational indicator 43*w* representing the original route. Accordingly, if the user wants to know precisely the drop-by route for circumventing the traffic congestion, the user merely needs to select and set the destination. When the user takes this drop-by route and passes the certain time at the drop-by facility, the user would not waste his/her time. He can enjoy time-consuming-free travel to the destination. Thus, the most serviceable route is provided for the user.

While preferred embodiments have been described, variations thereto may be made in the invention as follows without departing from the spirit and scope thereof. Although, in the aforementioned embodiments, the traffic information TI comprises traffic congestion area data which represents the traffic congestion area on the route, the invention is not limited to such a case. For example, the traffic information TI may comprise other data, such as, data which represents road construction area, traffic accident area, or closed road area.

Although, in the aforementioned embodiments, the mobile communication device 12 is embodied as the vehicle navigation apparatus 31 including the cellular phone 52, the invention is not limited to such a case. For example, instead of the cellular phone 52, a transceiver (or a radio transmitter) for transmitting/receiving the road information RI and the traffic information TI may be applicably included in the apparatus 31. Although, in the aforementioned embodiments, the device 12 is embodied as the vehicle navigation apparatus 31, the invention is not limited to such a case. For example, the device 12 may be embodied as a cellular phone or a PDA (Persona Digital Assistants) which either having present position detection means such as a GPS device.

Although, in the aforementioned embodiments, the road data as one of the components of the road information RI represents the road located within three-kilometer range from the arbitrary point on the route searched by the device 12 or three-kilometer range from the registered point registered by the device 12, the invention is not limited to such a case. For example, the road data may represent only roads that include the arbitrary point or may represent roads located within a ten-kilometer range from the arbitrary point. Although, in the aforementioned embodiments, the device 12 carries out the extraction of the road data as one of the components of the road information RI, the invention is not limited to such a case. For example, the center 10 may carry out the extraction of the road data. In such case, the center 10 may include a map server from which the device 12 may extract the road data about roads located within a specified distance from the arbitrary point on the route searched by the device 12 or a specified distance from the registered point registered by the device 12.

Although, in the aforementioned embodiments, the CPU 53 as a route search device included in the device 12 searches both the route from the present position to the registered point/destination and the necessary time therefore, the invention is not limited to such a case. For example, the control server 25 in the center 10 may search the route and the necessary time therefore.

Although, in the aforementioned embodiments, the device 12 carries out both re-search of the route for circumventing the traffic congestion area and the calculation of the necessary time for each route when the user wants to know the route to circumvent the traffic congestion, the invention is not limited to such a case. For example, receiving the coordinates data about the present position and the destination from the device 12, the center 10 may carry out the re-search and the calculation. Thereby, the transmission/receipt of the data between the device 12 and the center 10 may be reduced to one time. This one-time data transmission/receipt can prevent the excessive load on the system compared to the data transmission/receipt in the route re-searching according to the aforementioned embodiment.

In the aforementioned embodiments, the device 12 carries out the extraction of both the road data and the predictive arrival date-and-time data which varies according to the varied departure time T in order to determine the optimum departure time. Further, the device 12 carries out the extraction of the shortest necessary time from every necessary time for traveling the route being departed at every departure time T. However, the invention is not limited to such cases. For example, receiving the coordinates data about the present position and the destination from the device 12, the center 10 may carry out the extraction of both the road data and the predictive arrival date-and-time data which vary according to the varied departure time T. Further, the center 10 may carry out the extraction of the shortest necessary time from every necessary time for traveling the route being departed at every departure time T. Thereby, the transmission/receipt of the data between the device 12 and the center 10 may be reduced.

Although, in the aforementioned embodiments, the device 12 carries out both re-search of the drop-by route for circumventing the traffic congestion area and the calculation of the necessary time for each route when the user wants to know the drop-by route to circumvent the traffic congestion, the invention is not limited to such a case. For example, receiving the coordinates data about the present position and the destination from the device 12, the center 10 may carry out the re-search and the calculation. Thereby, the transmission/receipt of the data between the device 12 and the center 10 may be reduced to one time. This one-time data transmission/receipt can prevent the excessive load on the system compared to the data transmission/receipt in the route re-searching according to the aforementioned embodiment.

Although, in the aforesaid embodiments the device 12 calculates the predictive arrival date-and-time data as one of the components of the road information RI, the invention is not limited to such a case. For example, the center 10 may calculate the predictive arrival date-and-time data. Although, in the aforementioned embodiments, each data stored and controlled in the servers 23, 24, and 25 is registered by the administrator who works at the center 10, the invention is not limited to such a case. For example, an outsider may register said each data externally from a personal computer which connected to the center 10 via a network such as the Internet. Further, for example, data issued from some official organizations may be automatically registered in the server 24 as the predictive traffic congestion data.

Although, in the aforementioned embodiments, the CPU 53 in the apparatus 31 calculates the necessary time for traveling from the present position to the registered point/the destination based on the assumption that the route is traveled at legal speed, the invention is not limited to such a case. For example, the necessary time may be calculated based on an average speed of the vehicle 11 which travels the route within the specified time. Further, for example, the necessary time may be calculated according to the road traffic information obtained from the VICS receiving device 50. And further, the necessary time may be calculated based on the traffic information TI, distributed from the center 10, in view of the delay time owing to the traffic congestion and the traffic accidents.

Although, in the aforementioned embodiments, the predictive traffic date-and-time data represents the predictive date-and-time when the vehicle 11 traveling at a legal speed reaches the road represented by the road data, this invention is not limited to such a case. For example, the predictive traffic date-and-time data may be used to define an arrival range traveled in specified time from the present position. Further, for example, the predictive traffic date-and-time data may represent the arrival time when the vehicle traveling on the road within such range reaches the edge of the arrival range.

Figure 25:
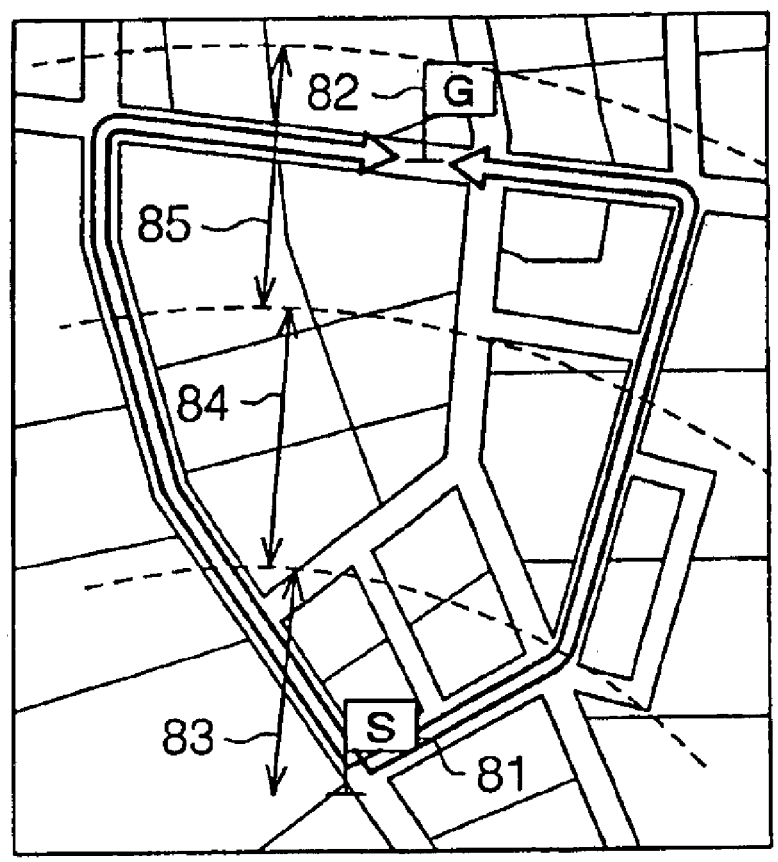
FIG. 25 illustrates arrival ranges traveled in each specified time.

In this case, as shown in FIG. 25, the arrival range expanding between a present position 81 and a destination 82 may be divided into three ranges: an arrival range 83 traveled in the first ten minutes from the present time, an arrival range 84 traveled in the next ten minutes, and an arrival range 85 traveled in the next ten minutes. For example, the predictive arrival date-and-time data being linked to the road data about the roads located within the arrival range 84 may represent the time after twenty minutes from the present time.

Although, in the aforementioned embodiments, the predictive traffic congestion data stored in the traffic information server 24 includes some factors such as the date-and-time and the road, the invention is not limited to such a case. For example, the predictive traffic congestion data may include the following factors; day of the week, seasons, or the weather. Thereby, the precision in predicting the traffic congestion may be improved compared to the prediction based on the factors such as the date-and-time and the road data.

In the aforementioned embodiments, the CPU 53 calculates coordinates data about every arbitrary point on the route between the present position and the destination at thirty-minute intervals in order to spot one arbitrary point on the route. This calculation is based on the necessary time for traveling from the present position to the destination. However, the invention is not limited to such a case. For example, the CPU 53 may calculate the coordinates data about the arbitrary point based on a condition where the vehicle travels the route in a short time/long time or based on the route distance.

Although, in the aforementioned embodiments, every information stored in the RAM 56 is displayed onto the map 43*b* one after another at ten-second intervals in order of short-distance from the present position by the CPU 53, the invention is not limited to such a case. For example, the information may be displayed by scrolling around the map 43*b*.

In the aforementioned embodiments, the road data as one of the components of the predictive traffic congestion data represents the specified road section that is separated by the traffic lights and the intersections as well as defined by a departure point and an endpoint respectively represented by the latitude X and the longitude Y. However, the invention is not limited to such a case. For example, the road data may have an identifying code by which the road section is defined and displayed onto the screen.

In the aforementioned embodiments, the traffic congestion area data represents an area of the traffic congestion that occurs within the specified road section defined by the departure point and the endpoint respectively represented by the latitude X and the longitude Y. However, the invention is not limited to such a case. For example, the traffic congestion area data may have an identifying code by which the traffic congestion area is specified and displayed on the screen.

In the aforementioned embodiments, the user is informed of the predictive traffic congestion area around the arbitrary point, which is searched by the CPU 53, on the route from the present position to the destination. However, the invention is not limited to such a case. For example, the user may be informed of the predictive traffic congestion area around the arbitrary point which has been registered preliminarily by the device 12. Although, in the aforementioned embodiments, the re-search of the route for circumventing the traffic congestion is carried out twice according to the traffic congestion circumventive route search program, the invention is not limited to such a case. For example, said re-search may be repeated over any times. In the aforementioned embodiment, the departure time T is varied at fifteen-minute intervals for three hours from the present departure time T. Further the necessary time for traveling each route departed at said each varied departure time T is calculated according to the departure time determination program. However, the invention is not limited to such a case. For example, the necessary time may be calculated in accordance with other conditioned time. Although, in the aforementioned embodiment, the re-search of the drop-by route for circumventing the traffic congestion is carried out twice according to the drop-by route search program, the invention is not limited to such a case. For example, the re-search may be repeated over any time.

What is claimed is:

1. A method of retrieving traffic information, comprising:

storing predictive traffic information derived from statistical processing in relation to at least positional information and date-and-time information;

registering a point which a user desires to obtain the traffic information as a registered point;

displaying a name list of registered points;

selecting a desirable registered point from the name list;

obtaining positional information about the desirable registered point;

computing predictive arrival date-and-time information about the desirable registered point;

retrieving the predictive traffic information related to both the positional information and the predictive arrival date-and-time-information about the desirable registered point; and displaying a map around the desirable registered point and a navigational indicator on the map which represents a traffic congestion area based on the retrieved predictive traffic information.

2. A method of retrieving traffic information, comprising:

storing predictive traffic information derived from statistical processing in relation to at least positional information and date-and-time information;

inputting a present position of a mobile communication device and a destination;

searching a route from the present position to the destination;

calculating points on the route to which the route predictably takes a predetermined time to travel from the present position;

obtaining positional information about the calculated points on the route;

computing predictive arrival date-and-time information about the calculated points on the route;

retrieving the predictive traffic information related to the positional information and the predictive arrival date-and-time information about the calculated points on the route; and displaying a map around the calculated points and a navigational indicator which represents a traffic congestion area based on the retrieved predictive traffic information one after another in order of a shortest distance from the present position.

3. A traffic information retrieval system, comprising:

a storage device that stores predictive traffic information derived from statistical processing in relation to at least positional information and date-and-time information; and a controller that:

registers a point which a user desires to obtain the traffic information as a registered point;

outputs a name list of registered points;

selects a desirable registered point from the name list;

obtains the positional information about the desirable registered point;

computes predictive arrival date-and-time information about the desirable registered point;

retrieves the predictive traffic information related to the positional information and the predictive arrival date-and-time information about the desirable registered point from the storage device; and outputs a map around the desirable registered point and a navigational indicator on the map which represents a traffic congestion area based on the retrieved predictive traffic information.

4. The traffic information retrieval system according to claim 3, wherein the controller outputs a name of the registered point, the predictive arrival date-and-time information, and the predictive traffic information.

5. A traffic information retrieval system, comprising:

a storage device that stores predictive traffic information derived from statistical processing in relation to at least positional information and date-and-time information;

a detector that detects a present position of a mobile communication device;

an input device that inputs a destination; and a controller that:

searches a route from the present position to the destination;

calculates points on the route to which the route predictable takes a predetermined time to travel from the present position;

obtains positional information about the calculated points on the route;

computes predictive arrival date-and-time information about the calculated points on the route;

retrieves the predictive traffic information related to the positional information and the predictive arrival date-and-time information about the calculated points on the route from the storage device; and outputs a map around the calculated points and a navigational indicator which represents a traffic congestion area based on the retrieved predictive traffic information one after another in order of a shortest distance from the present position.

6. The traffic information retrieval system according to claim 5, wherein the controller outputs a name of the arbitrary point on the route, the predictive arrival date-and-time information, and the predictive traffic information.

7. The traffic information retrieval system according to claim 5, wherein in the case of a plurality of arbitrary points, the respective predictive traffic information about the plurality of arbitrary points are outputted one after another at specified-time intervals in order of short distance from the present position to the respective arbitrary points.

8. A mobile communication device which transmits/receives various information to/from a network navigation center, comprising:
   a controller that:
      registers a point which a user desires to obtain the traffic information as a registered point;
      outputs a name list of registered points;
      selects a desirable registered point from the name list;
      obtains the positional information about the desirable registered point;
      computes predictive arrival date-and-time information about the desirable registered point;
      transmits the positional information and the predictive arrival date-and-time information about the desirable registered point to the network navigation center;
      receives predictive traffic information related to the positional information and the predictive arrival date-and-time information from the network navigation center; and
      outputs a map around the desirable registered point and a navigational indicator on the map which represents a traffic congestion area based on the received predictive traffic information.

9. The mobile communication device according to claim 8, wherein the controller outputs a name of the registered point, the predictive arrival date-and-time information, and the predictive traffic information.

10. A mobile communication device which transmits/receives various information to/from a network navigation center, comprising:
   a detector that detects a present position of the mobile communication device;
   an input device that inputs a destination; and
   a controller that:
      searches a route from the present position to the destination;
      calculates points on the route to which the route predictable takes a predetermined time to travel from the present position;
      obtains positional information about the calculated points on the route;
      computes predictive arrival date-and-time information about the calculated points on the route;
      transmits the positional information and the predictive arrival date-and-time information about the calculated points on the route to the network navigation center;
      receives predictive traffic information related to the positional information and the predictive arrival date-and-time information from the network navigation center; and
      outputs a map around the calculated points and a navigational indicator which represents a traffic congestion area based on the received predictive traffic information one after another in order of a shortest distance from the present position.

11. The mobile communication device according to claim 10, wherein the controller outputs a name of the arbitrary point on the route, the predictive arrival date-and-time information, and the predictive traffic information.

12. The mobile communication device according to claim 10, wherein, in the case of a plurality of arbitrary points, the respective predictive traffic information about the plurality of arbitrary points are outputted one after another at specified-time intervals in order of short distance from the present position to the respective arbitrary points.

13. A network navigation center, comprising:
   a storage device that stores predictive traffic information derived from statistical processing in relation to at least positional information and date-and-time information;
   a receiver that receives a present position of a mobile communication device and positional information about a desirable registered point from the mobile communication device; and
   a controller that:
      computes predictive arrival date-and-time information that represents the date and time of arrival at the desirable registered point from the present position;
      retrieves the predictive traffic information related to the positional information and the predictive arrival date-and-time information about the desirable registered point from the storage device; and
      transmits a map around the desirable registered point and a navigational indicator on the map which represents a traffic congestion area based on the retrieved predictive traffic information to the mobile communication device.

14. A network navigation center, comprising:
   a storage device that stores predictive traffic information derived from statistical processing in relation to at least positional information and date-and-time information;
   a receiver that receives a present position of a mobile communication device and positional information about a destination from the mobile communication device; and
   a controller that:
      searches a route from the present position to the destination;
      calculates points on the route to which the route predictable takes a predetermined time to travel from the present position;
      obtains positional information about the calculated points on the route;
      computes predictive arrival date-and-time information about the calculated points on the route;
      retrieves predictive traffic information related to the positional information and the predictive arrival date-and-time information about the calculated points on the route from the storage device; and
      transmits a map around the calculated points and a navigational indicator which represents a traffic congestion area based on the retrieved predictive traffic information one after another in order of a shortest distance from the present position to the mobile communication device.

* * * * *